US010993384B2

(12) United States Patent
Carter

(10) Patent No.: US 10,993,384 B2
(45) Date of Patent: May 4, 2021

(54) MOWER PATH ASSISTANCE SYSTEM

(71) Applicant: Thomas R. Carter, Wapakoneta, OH (US)

(72) Inventor: Thomas R. Carter, Wapakoneta, OH (US)

(*) Notice: Subject to any disclaimer, the term of this patent is extended or adjusted under 35 U.S.C. 154(b) by 536 days.

(21) Appl. No.: 15/865,863

(22) Filed: Jan. 9, 2018

(65) Prior Publication Data

US 2019/0208715 A1  Jul. 11, 2019

(51) Int. Cl.
| | |
|---|---|
| *A01G 13/02* | (2006.01) |
| *E04H 17/06* | (2006.01) |
| *A01D 34/00* | (2006.01) |
| *A01G 9/28* | (2018.01) |
| *E04H 12/22* | (2006.01) |
| *A01D 75/18* | (2006.01) |

(52) U.S. Cl.
CPC ....... *A01G 13/0281* (2013.01); *A01D 34/001* (2013.01); *A01D 75/185* (2013.01); *A01G 9/28* (2018.02); *E04H 12/2238* (2013.01); *E04H 17/063* (2013.01)

(58) Field of Classification Search
CPC . A01G 9/02; A01G 9/28; A01G 13/02; A01G 13/0281
USPC ....... 47/9, 20.1, 21.1, 31.1, 32.3, 32.4, 32.5, 47/32.6, 58.1 SE
See application file for complete search history.

(56) References Cited

U.S. PATENT DOCUMENTS

| | | | |
|---|---|---|---|
| 69,346 A | 10/1867 | Jillson | |
| 80,012 A | 7/1868 | Robbins | |
| 313,424 A | 3/1885 | Hughes | |
| 921,484 A | 5/1909 | Turner | |
| 1,110,377 A | 9/1914 | Cowles | |
| 1,130,546 A | 3/1915 | Scott | |
| 1,350,603 A * | 8/1920 | Gerritson | E04G 11/36 249/18 |
| 1,453,810 A | 5/1923 | Sleen | |
| 1,910,289 A | 5/1933 | Hoag | |
| 1,931,602 A | 10/1933 | Colman | |
| 2,029,343 A | 2/1936 | Sperr | |
| 2,822,644 A | 2/1958 | Berger | |
| 2,949,698 A * | 8/1960 | Downey | A01G 13/0281 47/9 |
| 2,978,837 A | 4/1961 | Daniels | |

(Continued)

FOREIGN PATENT DOCUMENTS

| | | | | |
|---|---|---|---|---|
| DE | 2537056 A1 * | 3/1977 | ............. | B32B 5/022 |
| DE | 2658352 A1 * | 6/1978 | ......... | A01G 13/0281 |

(Continued)

*Primary Examiner* — Ebony E Evans
(74) *Attorney, Agent, or Firm* — Dawsey Co., LPA; David J. Dawsey

(57) ABSTRACT

A mower path assistance system to encircle an obstacle projecting from a ground surface, including a barrier mat formed with a barrier mat aperture enclosed by the barrier mat and having a barrier mat aperture diameter, a perimeter edge, and a barrier mat installation slit extending from the perimeter edge to the barrier mat aperture, wherein the barrier mat is deformable around the barrier mat installation slit to create a pathway having a pathway width through which the obstacle may pass from the perimeter to the barrier mat aperture. The barrier mat has a plurality of edges with axes that intersect at obtuse angles.

20 Claims, 18 Drawing Sheets

(56) References Cited

U.S. PATENT DOCUMENTS

| | | | | |
|---|---|---|---|---|
| 3,005,287 | A | 10/1961 | Dudley | |
| 3,059,378 | A | 10/1962 | Noras | |
| 3,287,851 | A | 11/1966 | Cramer | |
| 3,305,969 | A * | 2/1967 | Mattson | A01G 13/0281 47/32 |
| 3,439,450 | A | 4/1969 | Richards | |
| 3,571,972 | A * | 3/1971 | Carter, Jr. | E01F 15/0469 47/32.4 |
| 3,704,004 | A * | 11/1972 | Carter, Jr. | E04H 17/063 256/1 |
| 3,727,347 | A | 4/1973 | Barnes | |
| 3,822,864 | A | 7/1974 | Keys | |
| 3,857,195 | A | 12/1974 | Johnson | |
| 3,998,006 | A | 12/1976 | Riedel | |
| 4,317,309 | A | 3/1982 | Sheldon | |
| 4,463,529 | A | 8/1984 | Singer et al. | |
| 4,502,244 | A | 3/1985 | Yoham | |
| 4,584,789 | A | 4/1986 | Jean et al. | |
| 4,590,705 | A | 5/1986 | Prince | |
| 4,648,203 | A | 3/1987 | Worzek | |
| 4,858,378 | A | 8/1989 | Helmy | |
| 4,903,947 | A | 2/1990 | Groves | |
| 4,932,157 | A | 6/1990 | Shimp | |
| 4,934,093 | A | 6/1990 | Yanna | |
| 4,986,025 | A | 1/1991 | Imperial | |
| 5,058,317 | A | 10/1991 | McMurtrey | |
| 5,065,543 | A | 11/1991 | Brook | |
| 5,085,001 | A | 2/1992 | Crawley | |
| 5,231,793 | A | 8/1993 | Allen | |
| 5,279,069 | A | 1/1994 | Myer | |
| 5,285,594 | A | 2/1994 | Penny | |
| 5,323,557 | A | 6/1994 | Sonntag | |
| 5,367,822 | A | 11/1994 | Beckham | |
| 5,379,558 | A * | 1/1995 | Mason | A01G 13/0281 52/105 |
| 5,396,731 | A | 3/1995 | Byrne | |
| 5,425,204 | A | 6/1995 | Holmes et al. | |
| 5,502,921 | A | 4/1996 | Hyslop | |
| 5,509,231 | A * | 4/1996 | Marcoux | A01G 13/0281 47/32 |
| 5,528,855 | A | 6/1996 | Kapphahn | |
| 5,548,923 | A | 8/1996 | Myer | |
| 5,605,009 | A * | 2/1997 | Elder | A01G 13/0281 47/32 |
| 5,678,353 | A | 10/1997 | Tsao et al. | |
| 5,709,049 | A | 1/1998 | Baird | |
| 5,711,106 | A | 1/1998 | Ellis | |
| 5,762,323 | A | 6/1998 | Boswell et al. | |
| 5,878,528 | A | 3/1999 | Pattyn | |
| 5,918,411 | A | 7/1999 | Hadrava | |
| 6,128,852 | A | 10/2000 | Hansen | |
| 6,195,935 | B1 * | 3/2001 | Bellucci | A01G 13/0281 47/9 |
| D440,833 | S * | 4/2001 | Tanner | D8/1 |
| 6,276,869 | B1 | 8/2001 | Yakushinji | |
| 6,412,217 | B1 * | 7/2002 | Hynninen | A01G 13/0281 47/20.1 |
| 6,446,400 | B1 | 9/2002 | Block et al. | |
| 6,640,490 | B1 | 11/2003 | Boehringer | |
| D483,629 | S * | 12/2003 | Markfelder | D8/1 |
| 6,705,044 | B2 | 3/2004 | Clancey | |
| 6,739,088 | B1 | 5/2004 | Stoller | |
| 7,160,054 | B2 | 1/2007 | Smiley | |
| 7,452,159 | B2 | 11/2008 | Alexander | |
| 7,568,314 | B2 * | 8/2009 | Collins | H02G 3/22 52/219 |
| 7,685,764 | B2 | 3/2010 | Moore | |
| 8,215,056 | B2 | 7/2012 | Frederick | |
| 8,752,507 | B2 * | 6/2014 | Korrie | A01K 5/0135 119/61.54 |
| 9,273,436 | B1 | 3/2016 | Kulp | |
| 9,615,514 | B2 | 4/2017 | Nepa et al. | |
| 2002/0124463 | A1 | 9/2002 | Venable | |
| 2004/0020112 | A1 | 2/2004 | Lloyd | |
| 2005/0279981 | A1 | 12/2005 | Onbey | |
| 2006/0130399 | A1 * | 6/2006 | McDonald | E04H 12/2238 47/58.1 SE |
| 2008/0134574 | A1 * | 6/2008 | Zimmer | A01G 13/0281 47/31 |
| 2008/0202023 | A1 * | 8/2008 | Moore | A01G 13/0281 47/9 |
| 2008/0246012 | A1 | 10/2008 | Brush | |
| 2011/0311754 | A1 | 12/2011 | Kray | |
| 2014/0069033 | A1 | 3/2014 | Morning | |
| 2014/0245660 | A1 | 9/2014 | Rooney | |

FOREIGN PATENT DOCUMENTS

| | | | | |
|---|---|---|---|---|
| DE | 2832460 | A1 * | 2/1980 | A01G 9/28 |
| DE | 9209549 | U1 * | 9/1992 | A01G 13/0281 |
| GB | 112662 | A * | 1/1918 | A01G 13/0281 |
| GB | 1381679 | A * | 1/1975 | A01G 13/0281 |

* cited by examiner

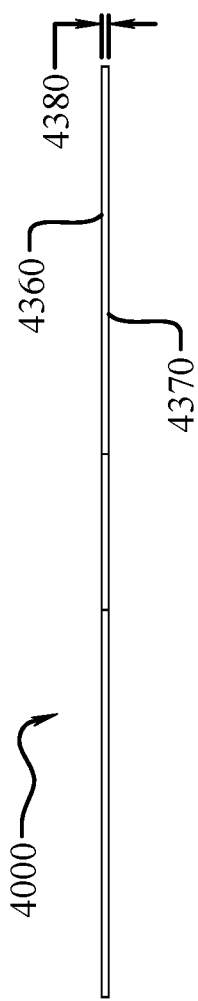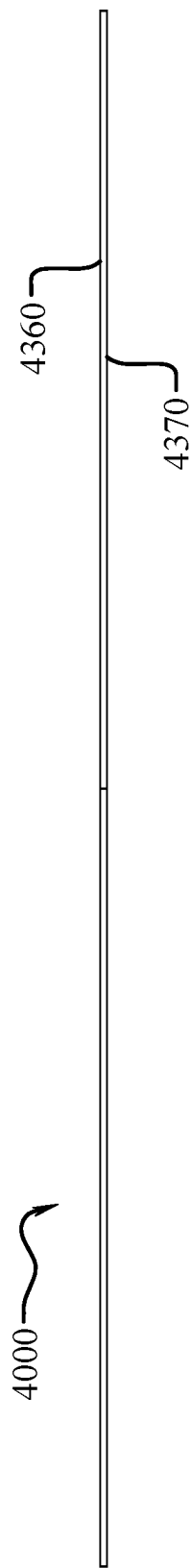

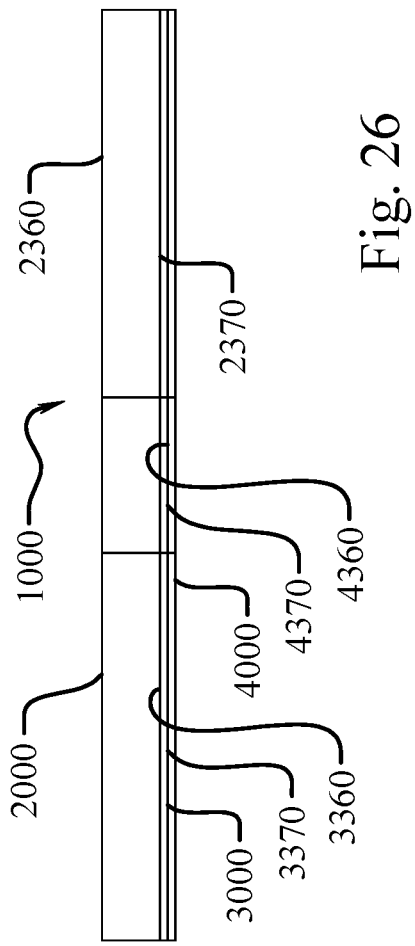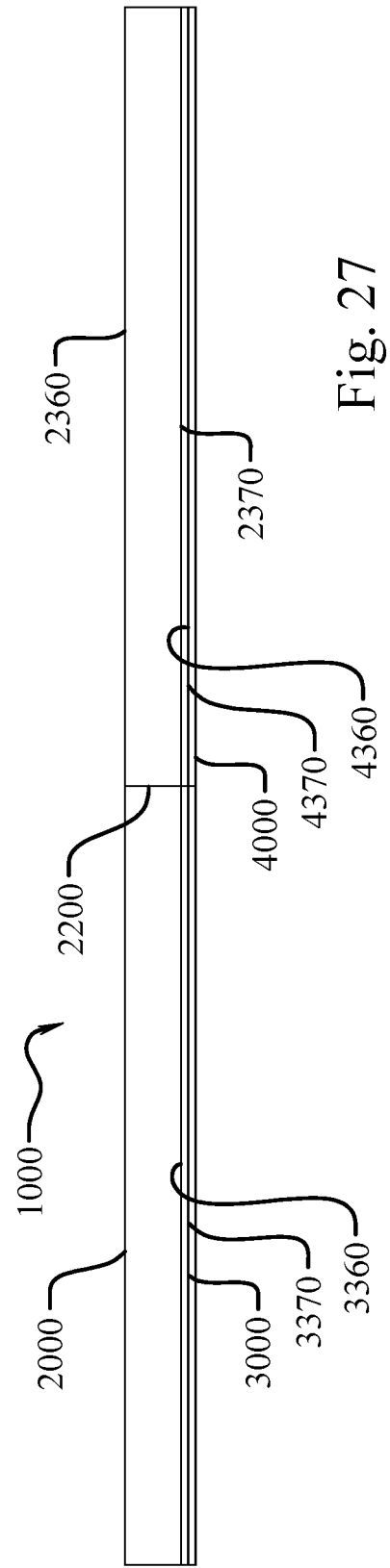

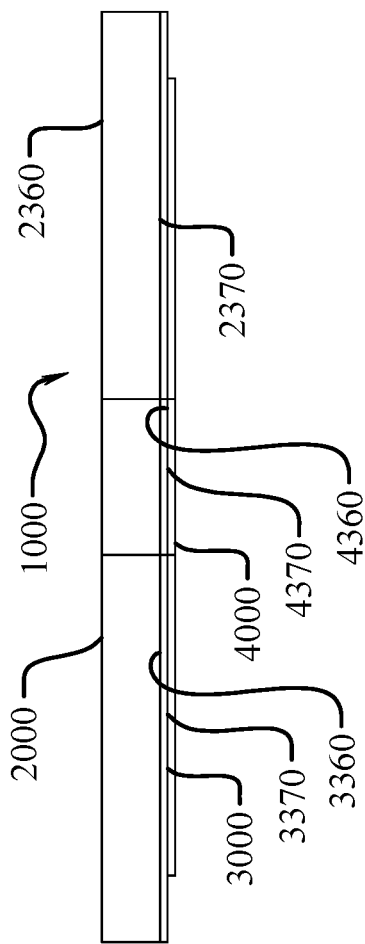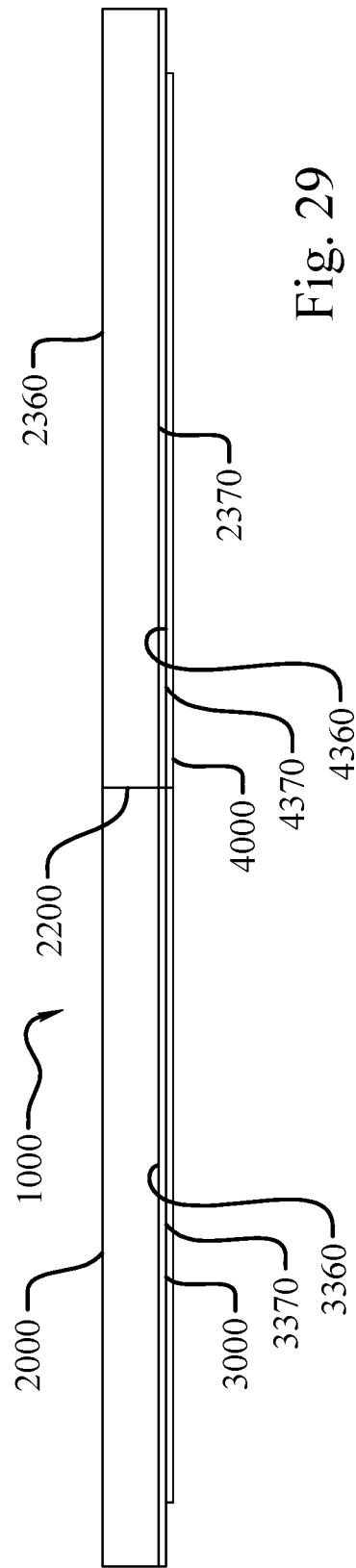

MOWER PATH ASSISTANCE SYSTEM

CROSS-REFERENCE TO RELATED APPLICATIONS

Not applicable.

TECHNICAL FIELD

The present disclosure relates to the field of mower path assistance system, particular to a system that encircles an obstacle projecting from a ground surface

BACKGROUND OF THE INVENTION

The present invention relates generally to methods and devices for creating a safe working environment around vertical projections and obstructions and for preventing vegetation. More particularly, the invention is directed to methods and devices for covering the ground area immediately surrounding such projections to eliminate the need for the mower to perform a full 360 circle around the projection and maintain a substantially parallel mowing path, and reduce the growth of vegetation, while reducing the risks associated with mowing near such obstructions. Fire hydrants, mail box posts, fence posts, guy wires, and other similar ground-anchored structures generally require a mower to deviate from a traditional mower path consisting largely of parallel opposed direction mowing paths. Such deviations, particularly when they require the mower to slow down and make a full 360 degree circle around an obstacle, significantly reduce the efficiency of mowing project adding significant time and danger associated from such maneuvers. After all, the natural tendency is to try to mow as close to the obstruction as practical so as to reduce the amount of post-mowing trimming that is required. Obviously, trying to mow within inches of an obstruction while moving at a high speed is prone for accidents, which can be life threatening. Further, such obstacles are often located in areas where vegetation grows around the base of the structure. Vegetation around the ground-anchored structures must routinely be maintained to prevent the overgrowth of vegetation. Due to the above problems associated with vegetation growth around ground-anchored structures, routine maintenance must be performed to control the growth, which generally consists of a secondary step of trimming around the obstacle after mowing around the obstacle. There are several problems associated with these prior art methods for controlling vegetation around the ground-anchored structures. The secondary step of trimming around the ground-anchored structure to control vegetation growth results in substantial labor and other costs, as does the deviation from the parallel path mowing plan. In addition, damage can be caused to the structures themselves or to mower and equipment which collides with the ground-anchored structures which may be partially concealed by vegetation growth. The cost of repairing or replacing mowers due to damage caused by concealed ground-anchored structures can be substantial, as is the risk of injury. Additionally, problems are also encountered by the use of herbicides to control vegetation around such obstacles. The harmful chemicals may result in environmental damages and concern and potentially getting to the ground water. Herbicides may also be corrosive and can cause damage to the ground-anchored structures. The present invention provides a barrier system and method to reduce vegetation growth around posts, guy wires, trees, and other lawn obstacles and reduce vegetation growth around such projections, while improving mower safety.

SUMMARY OF INVENTION

A mower path assistance system to encircle an obstacle projecting from a ground surface, including a barrier mat formed with a barrier mat aperture enclosed by the barrier mat and having a barrier mat aperture diameter, a perimeter edge, and a barrier mat installation slit extending from the perimeter edge to the barrier mat aperture, wherein the barrier mat is deformable around the barrier mat installation slit to create a pathway having a pathway width through which the obstacle may pass from the perimeter to the barrier mat aperture. The barrier mat has a plurality of edges with axes that intersect at obtuse angles.

BRIEF DESCRIPTION OF THE DRAWINGS

Without limiting the scope of the mower path assistance system as claimed below and referring now to the drawings and figures:

FIG. 20 is a left side elevation view of an embodiment of an herbicide layer, not to scale;

FIG. 21 is a front elevation view of an embodiment of an herbicide layer, not to scale;

FIG. 26 is a left side elevation view of an embodiment of a mower path assistance system having a barrier mat, a bonded skirting membrane and a bonded herbicide layer, not to scale;

FIG. 27 is a front side elevation view of an embodiment of a mower path assistance system having a barrier mat, a bonded skirting membrane and a bonded herbicide layer, not to scale;

FIG. 28 is a left side elevation view of an embodiment of a mower path assistance system having a barrier mat, a bonded skirting membrane and a bonded recessed herbicide layer, not to scale; and FIG. 29 is a front side elevation view of an embodiment of a mower path assistance system having a barrier mat, a bonded skirting membrane and a bonded recessed herbicide layer, not to scale.

Figure 1:
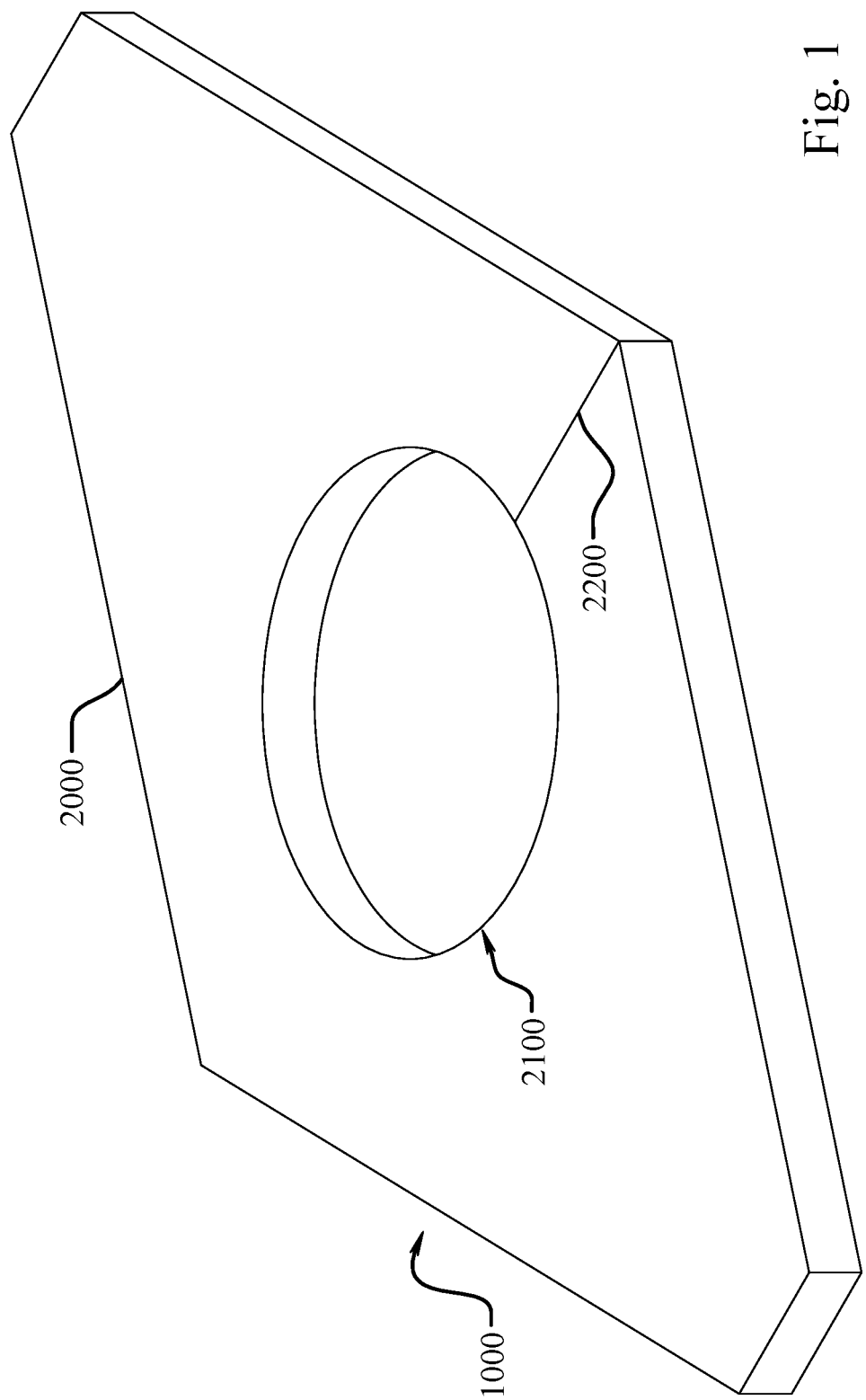
FIG. 1 is an isometric view of an embodiment of a mower path assistance system, not to scale.
Figure 2:
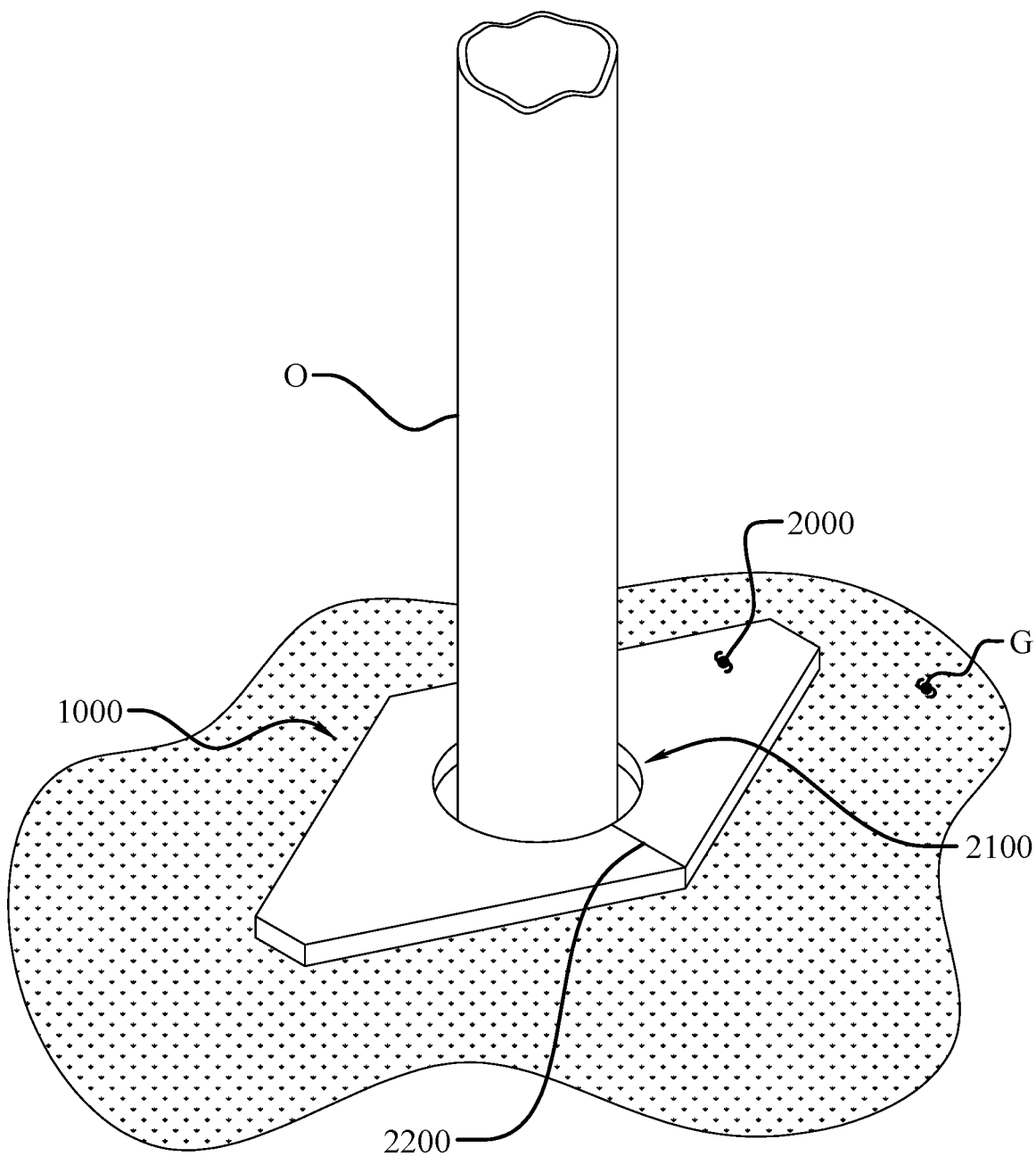
FIG. 2 is an isometric view of an embodiment of an installed mower path assistance system, not to scale.
Figure 3:
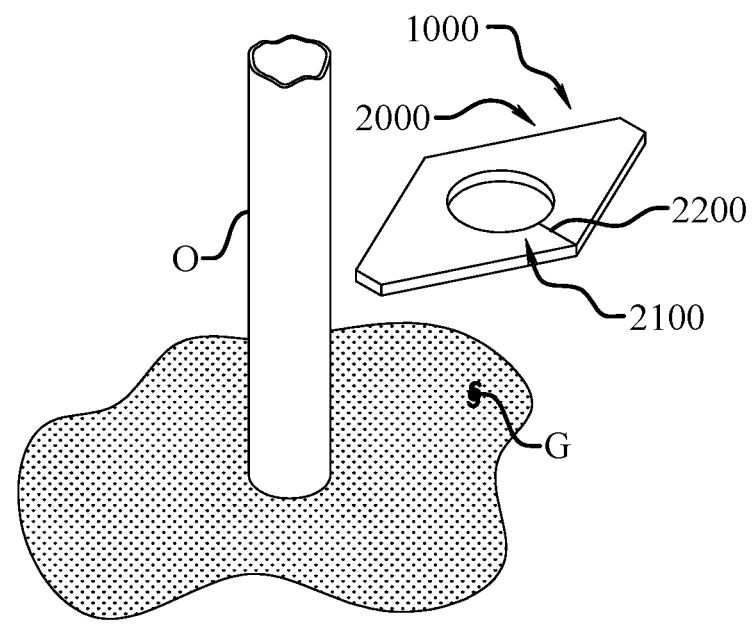
FIG. 3 is an isometric view of an embodiment of a mower path assistance system, not to scale.
Figure 4:
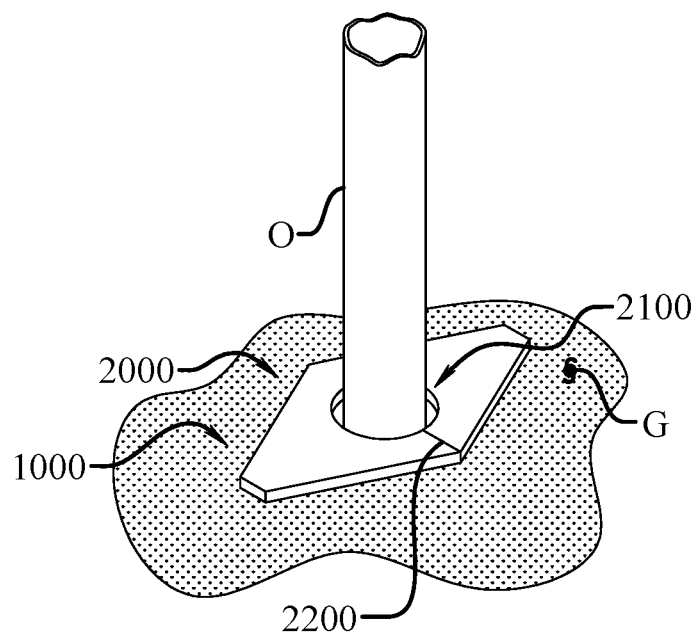
FIG. 4 is an isometric view of an embodiment of an installed mower path assistance system, not to scale.

These drawings are provided to assist in the understanding of the exemplary embodiments of the presently disclosed mower path assistance system, as described in more detail below and should not be construed as unduly limiting the mower path assistance system. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

A mower path assistance system and method to improve mowing efficiency and reduce the dangers of mowing around obstacles protruding from the ground. The system provides a secondary benefit of reducing vegetation growth around posts, guy wires, trees, and other lawn obstacles, while improving mower safety and efficiency by reducing the amount of deviation required to mow around such obstacles. The term grass also includes weeds and any vegetation, and is not intended to be limited to ordinary lawn grass.

Lawn mowers cannot mow directly against posts, guy wires and other vertical lawn obstacles without introducing significant risk into the mowing process. As a result those who take care of lawns must use additional equipment, such as weed eaters, to cut the grass surrounding the posts, guy wires and other obstacles. Consequently, time is wasted and additional labor is required. Further, some lawn caretakers also introduce the additional step of use herbicide to kill vegetation around lawn obstacles, often producing a patch of dead and unattractive grass surrounding the obstacle and introducing environmental concerns.

The current invention facilitates mowing a lawn without having to significantly deviate from a highly efficient substantially parallel back-and-forth mowing path, thereby increasing the mowing efficiency, reducing the risk of injury to the person or the equipment, and reducing the amount of follow up work with additional equipment to rid the grass around lawn obstacles. The preferred embodiments of the device accomplish this by new and novel arrangements of elements and methods that are configured in unique and novel ways and which demonstrate previously unavailable but preferred and desirable capabilities, offering significant labor savings while reducing the safety risks associated with mowing around such obstructions and eliminating environmental concerns associated with vegetation suppression applications. The detailed description set forth below in connection with the drawings is intended merely as a description of the presently preferred embodiments, and is not intended to represent the only form, systems, and methods which may be constructed or utilized. The description sets forth the designs, functions, means, and methods in connection with the illustrated embodiments. It is to be understood, however, that the same or equivalent functions and features may be accomplished by different embodiments that are also intended to be encompassed within the spirit and scope.

Barrier Mat (2000)

As seen in FIGS. 1-7, a mower path assistance system (1000) is configured to be installed around a lawn obstacle (O) on top of the ground (G), grass, or vegetation. In one embodiment, the barrier system (1000) comprises of a barrier mat (2000) having a barrier mat aperture (2100) and a barrier mat installation slit (2200), or multi-piece construction incorporating interlocking aspects. The barrier mat (2000) maybe composed of, but is not limited to, compositions including natural rubber (latex—grown from plants), synthetic rubber (made artificially in a chemical plant or laboratory) such as styrene butadiene (SBR), polyacrylics, polyvinyl acetate (PVA), polyvinyl chloride (PVC), polychloroprene (better known as neoprene), and various types of polyurethane, plastics, both natural and synthetic, including thermoplastics, thermosets, bioplastics made of natural materials such as those using natural materials such as grass, trees, and corn instead of fossil fuels, biodegradable plastics engineered to break down such as photodegradable and oxydegradable compositions, and eco/recycled plastics, as well as fabrics, paper products, composites including natural composites, fiber reinforced plastic, and polymer matrix composites, and laminates thereof. One embodiment of the barrier mat (2000) is fiber reinforced.

In one embodiment the barrier mat installation slit (2200) extends from a perimeter edge to the mat aperture (2100) and creates a pathway for an obstacle (O) to pass when the barrier mat (2000) is twisted or deformed to allow entry of the obstacle (O). Furthermore, the pathway created by the barrier mat installation slit (2200) leads to the barrier mat aperture (2100). Once the lawn obstacle (O) is located inside of the barrier mat aperture (2100), the barrier mat (2000) is allowed to relax and return to its relaxed state; thereby securing the barrier mat (2000) around the lawn obstacle (O). Next the barrier mat (2000) is positioned in the desired orientation that improves mowing efficiency and reduces risk.

Figure 8:
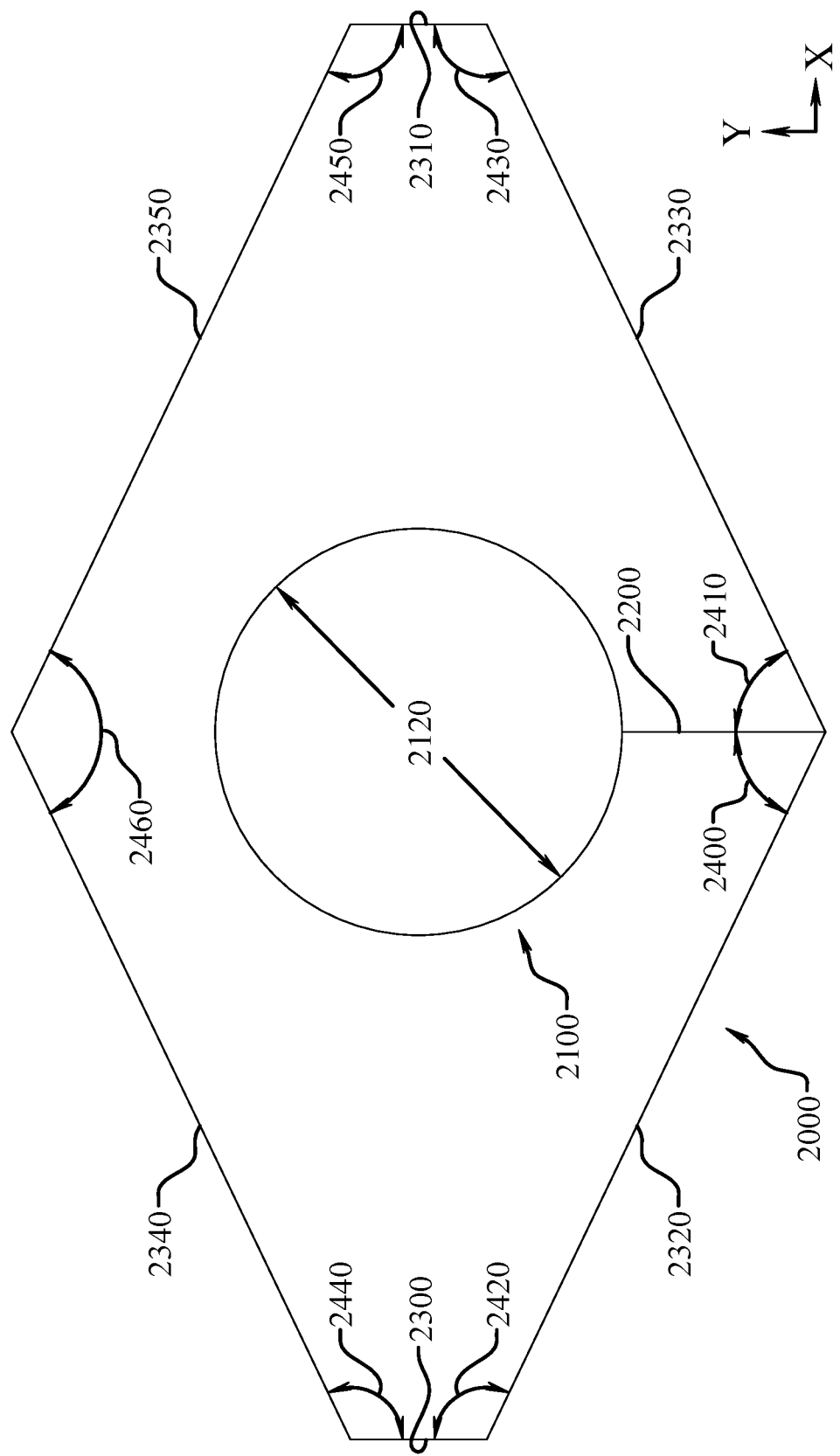
FIG. 8 is a top plan view of an embodiment of a barrier mat, not to scale.
Figure 9:
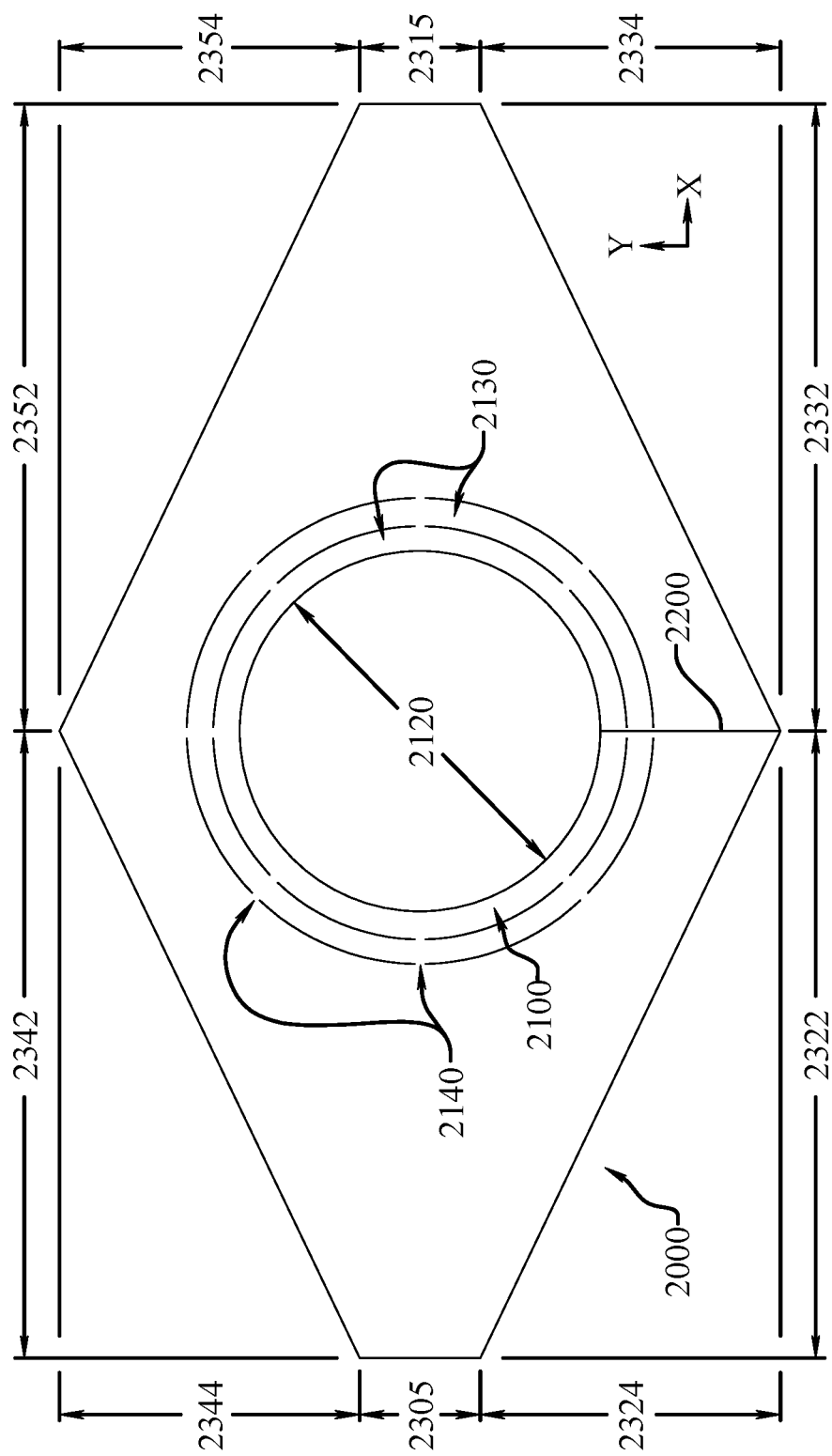
FIG. 9 is a top plan view of an embodiment of a barrier mat, not to scale.

Now with reference to the embodiment of FIGS. 8 and 9, the barrier mat aperture (2100) has a barrier mat aperture diameter (2120) that is configured to accept various lawn obstacles (O) that may vary in diameter to one another, however the barrier mat aperture (2100) is not limited to being circular in shape and references to the barrier mat aperture diameter (2120) apply to the largest opening dimension of the barrier mat aperture (2100) in non-circular embodiments. The pathway may be created by deforming the barrier mat (2000) with a deformation force of less than 10 lbf to create a pathway width that is at least 50% of the barrier mat aperture diameter (2120), while in another embodiment the pathway width is at least 75% of the barrier mat aperture diameter (2120), and in yet a further embodiment the pathway width is at least 90% of the barrier mat aperture diameter (2120). A further series of embodiments presents an upper boundary for the pathway width to provide additional durability and usability by capping the pathway width to no more than 100% of the aperture diameter (2120), and no more than 95% of the aperture diameter (2120) in another embodiment, and no more than 90% of the aperture diameter (2120) in yet a further embodiment.

An internal edge, or edges, of the barrier mat aperture (2100) define a barrier mat aperture lineal length. Similarly, the perimeter edge, or edges, of the barrier mat (2000) defines a perimeter edge lineal length. In one embodiment the perimeter edge lineal length is at least three times greater than the barrier mat aperture lineal length, at least four times greater in another embodiment, at least six times greater in a further embodiment, and at least eight times greater in still another embodiment. Another series of embodiments caps this relationship by having the perimeter edge lineal length no more than fifteen times greater than the barrier mat aperture lineal length in one embodiment, no more than thirteen times greater in a further embodiment, and no more than eleven times greater in still another embodiment.

In one embodiment, the barrier mat aperture diameter (2120) may be enlarged by removing one or more aperture diameter expansion rings (2130) formed in the barrier mat (2000) disposed around the barrier mat aperture (2100), which may be held into place by thin strips of aperture diameter expansion ring connecting material (2140), as seen in FIG. 9. In one embodiment such tear-away aperture diameter expansion rings (2130) allow adjustability from an initial barrier mat aperture diameter (2120) to a maximum barrier mat aperture diameter (2120), wherein the maximum barrier mat aperture diameter (2120) is at least 10% greater than the initial barrier mat aperture diameter (2120), while in a further embodiment it is at least 20% greater, and at least 30% greater in yet another embodiment.

In one particular embodiment directed to ensuring the structural stability of the barrier mat aperture (2100), the maximum barrier mat aperture diameter (2120) is no more than 75% greater than the initial barrier mat aperture diameter (2120), and no more than 50% greater in still another embodiment. One particular embodiment has the aperture diameter (2120) of at least 4", while in another embodiment it is at least 6", and in an even further embodiment it is at least 8". The aperture diameter (2120) is preferably less than 14" in one embodiment, and less than 12" in another embodiment, and less than 10" in yet a further embodiment. As previously disclosed the aperture may be other geometries and in one embodiment covering all shapes the open area of the aperture is at least 12 in$^2$, and at least 26 in$^2$ in another embodiment, and at least 45 in$^2$ in still a further embodiment. Further, the open area of the aperture is preferable less than 155 in$^2$, and less than 115 in$^2$ in another embodiment, and less than 80 in$^2$ in yet another embodiment. The barrier mat installation slit (2200) has a length that is preferably at least 25% of the aperture diameter (2120), and at least 35% in another embodiment, and at least 50% in yet a further embodiment. However, another series of embodiments closes the upper bound of the range with the length of the installation slit (2200) being no more than the aperture diameter (2120), and no more than 80% of the aperture diameter (2120) in a further embodiment, and no more than 75% of the aperture diameter (2120) in yet another embodiment. In one embodiment, as seen in FIG. 8, the barrier mat installation slit (2200) intersects the perimeter at the intersection of the barrier mat sinistral proximal edge axis and the barrier dextral proximal edge axis, however one skilled in the art will appreciate another embodiment whereby the barrier mat installation slit (2200) intersects the perimeter at the intersection of the barrier mat sinistral distal edge axis and the barrier dextral distal edge axis. The barrier mat installation slit (2200) may be positioned such that an imaginary extension of the barrier mat installation slit (2200) passes through a centroid of the barrier mat aperture (2100).

Figure 10:
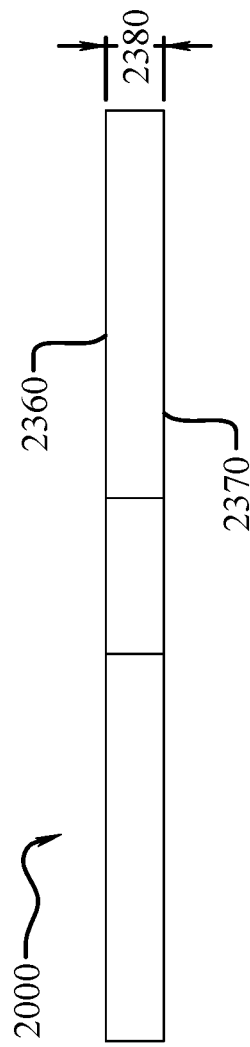
FIG. 10 is a left side elevation view of an embodiment of a barrier mat, not to scale.
Figure 11:
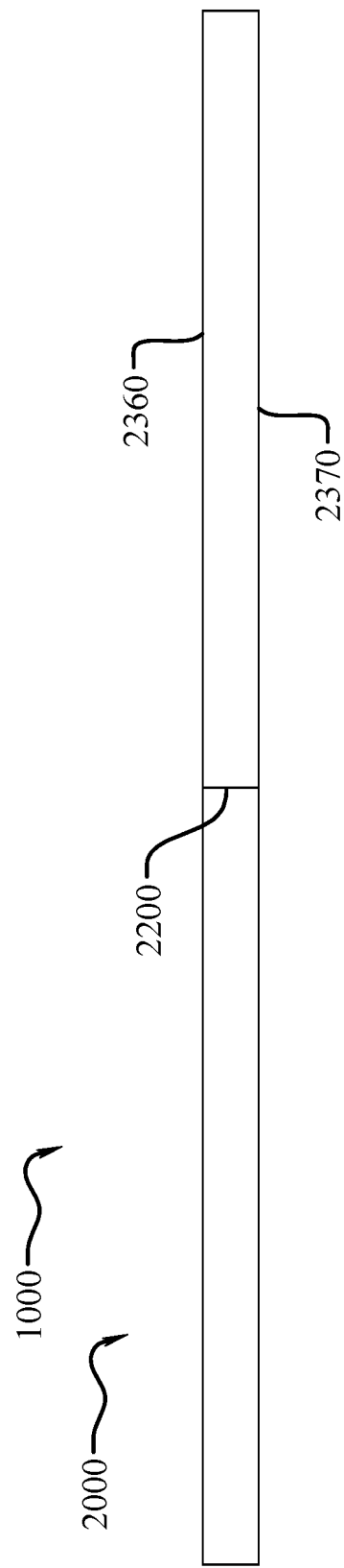
FIG. 11 is a front side elevation view of an embodiment of a barrier mat, not to scale.

The barrier mat (2000) has a barrier mat top surface (2360), a barrier mat bottom surface (2370), and a barrier mat thickness (2380), as seen in FIGS. 10 and 11. In one embodiment the barrier mat (2000) is substantially oval and therefore has a continuous perimeter edge, and in one oval embodiment a maximum length dimension is at least 1.5 times a maximum width dimension, which is measure perpendicular to the maximum length dimension, and thus having an aspect ratio, the maximum length divided by the maximum width, of at least 1.5, while in another embodiment the aspect ratio is at least 2.0, and in still a further embodiment the aspect ratio is at least 2.5. It is important to note that such aspect ratios apply equally regardless of whether the barrier mat (2000) is substantially oval in shape or any other shape, such as the illustrated embodiments having distinct sidewall edges. In another embodiment the aspect ratio is no more than 5.0, while in a further embodiment the aspect ratio is no more than 4.0, and in yet another embodiment the aspect ratio is no more than 3.0. Such aspect ratios have provided unexpected results by significantly reducing the likelihood of the barrier mat (2000) being drawn up into the blade or wheels of a mower as it passes over a portion of the barrier mat (2000) and providing a sufficient approach distance to reduce the required amount of deviation from the mowing path.

Therefore, in one embodiment the barrier mat (2000) includes as least four distinct sidewall edges, namely, as seen in FIGS. 8 and 9, a barrier mat sinistral proximal edge (2320), having a barrier mat sinistral proximal edge x-coordinate length (2322) and a barrier mat sinistral proximal edge y-coordinate length (2324); a barrier mat dextral proximal edge (2330), having a barrier mat dextral proximal edge x-coordinate length (2332) and a barrier mat dextral proximal edge y-coordinate length (2334); a barrier mat sinistral distal edge (2340), having a barrier mat sinistral distal edge x-coordinate length (2342) and a barrier mat sinistral distal edge y-coordinate length (2344); a barrier mat dextral distal edge (2350), having a barrier mat dextral distal edge x-coordinate length (2352) and a barrier mat dextral distal edge y-coordinate length (2354). One skilled in the art will appreciate that this embodiment is similar to that of FIGS. 8 and 9 but without the separate and distinct barrier mat sinistral edge (2300) and barrier mat dextral edge (2310), rather the barrier mat sinistral proximal edge (2320) may join the barrier mat sinistral distal edge (2340) via a smooth radiused transition or a sharp intersection, and the barrier mat dextral proximal edge (2330) may join the barrier mat dextral distal edge (2350) via a smooth radiused transition or a sharp intersection. Thus, one skilled in the art will further recognize that in such a symmetrical embodiment the aspect ratio is accordingly the sum of the barrier mat sinistral proximal edge x-coordinate length (2322) and the barrier mat dextral proximal edge x-coordinate length (2332) divided by the sum of the barrier mat sinistral proximal edge y-coordinate length (2324) and the barrier mat sinistral distal edge y-coordinate length (2344), although asymmetric embodiments are included in this disclosure. Regardless of the symmetry, in this embodiment at least one angle between two of the edges is obtuse. For example, as seen in FIG. 8, an axis of the barrier mat sinistral distal edge (2340) intersects with the axis of the barrier dextral distal edge (2350) and forms a barrier mat sinistral distal edge to dextral distal edge angle (2460) that is greater than 90 degrees. In this embodiment the axes are easily defined because the edges are straight, however in embodiments having curved edges, each point along the edge has a tangent line defining a tangency angle, and an average of all the tangency angles establishes the axis for the associated edge. Likewise, on the opposite side of FIG. 8, the angle between the barrier mat sinistral proximal edge (2320) and the barrier mat dextral proximal edge (2330) is the sum of a barrier mat sinistral proximal edge to installation slit angle (2400) and a barrier mat dextral proximal edge to installation slit angle (2410), and in one embodiment this sum angle is an obtuse angle. In a further embodiment at least one of the barrier mat sinistral proximal edge to installation slit angle (2400) and the barrier mat dextral proximal edge to installation slit angle (2410) are acute, while in yet another embodiment both the barrier mat sinistral proximal edge to installation slit angle (2400) and the barrier mat dextral proximal edge to installation slit angle (2410) are acute. In further embodiments any of the disclosed obtuse angles, or those disclosed as being greater than 90 degrees, are at least 100 degrees, while in still further embodiments any of the disclosed obtuse angles are at least 110 degrees, and in yet more embodiments any of the disclosed obtuse angles are at least 120 degrees. In even more variations, any of the disclosed obtuse angles are no more than 170 degrees, while in still further embodiments any of the disclosed obtuse angles are no more than 160 degrees, and in yet more embodiments any of the disclosed obtuse angles are no more than 150 degrees. Further, in one specific embodiment, as seen in FIGS. 8 and 9, the barrier mat (2000) has at least four distinct edges having straight segments and at least two of the angles formed between the straight segments of adjacent edges are obtuse angles, while in a further embodiment at least three of the angles formed between the straight segments of adjacent edges are obtuse angles, and in still another embodiment at least four of the angles formed between the straight segments of adjacent edges are obtuse angles. In yet another specific embodiment the barrier mat (2000) has at least five distinct edges having straight segments and at least three of the angles formed between the straight segments of adjacent edges are obtuse angles, while in a further embodiment at least four of the angles formed between the straight segments of adjacent edges are obtuse angles, and in still another embodiment at least five of the angles formed between the straight segments of adjacent edges are obtuse angles. Still another specific embodiment the barrier mat (2000) has at least six distinct edges having straight segments and at least four of the angles formed between the straight segments of adjacent edges are obtuse angles, while in a further embodiment at least five of the angles formed between the straight segments of adjacent edges are obtuse angles, and in still another embodiment at least six of the angles formed between the straight segments of adjacent edges are obtuse angles.

One embodiment has the barrier mat sinistral proximal edge x-coordinate length (2322) being at least 50% greater than the barrier mat sinistral proximal edge y-coordinate length (2324); similarly another embodiment has the barrier mat sinistral distal edge x-coordinate length (2342) being at least 50% greater than the barrier mat sinistral distal edge y-coordinate length (2344); similarly yet a further embodiment has the barrier mat dextral proximal edge x-coordinate length (2332) being at least 50% greater than the barrier mat dextral proximal edge y-coordinate length (2334); and a final embodiment has the barrier mat dextral distal edge x-coordinate length (2352) being at least 50% greater than the barrier mat dextral distal edge y-coordinate length (2354), while further embodiments incorporate any combinations thereof. Still further embodiments uniquely cap the upper end of these relationships to further ensure stability and safety of the barrier mat (2000). For example, in one embodiment has the barrier mat sinistral proximal edge x-coordinate length (2322) is no more than 200% greater than the barrier mat sinistral proximal edge y-coordinate length (2324); similarly another embodiment has the barrier mat sinistral distal edge x-coordinate length (2342) is no more than 200% greater than the barrier mat sinistral distal edge y-coordinate length (2344); similarly yet a further embodiment has the barrier mat dextral proximal edge x-coordinate length (2332) is no more than 200% greater than the barrier mat dextral proximal edge y-coordinate length (2334); and a final embodiment has the barrier mat dextral distal edge x-coordinate length (2352) is no more than 200% greater than the barrier mat dextral distal edge y-coordinate length (2354), while further embodiments incorporate any combinations thereof. In still another embodiment these benefits are enhanced when the barrier mat sinistral proximal edge x-coordinate length (2322) is greater than the aperture diameter (2120) and the barrier mat sinistral proximal edge y-coordinate length (2324) is less than the aperture diameter (2120); similarly another embodiment has the barrier mat sinistral distal edge x-coordinate length (2342) greater than the aperture diameter (2120) and the barrier mat sinistral distal edge y-coordinate length (2344) is less than the aperture diameter (2120); similarly yet a further embodiment has the barrier mat dextral proximal edge x-coordinate length (2332) is greater than the aperture diameter (2120) and the barrier mat dextral proximal edge y-coordinate length (2334) is less than the aperture diameter (2120); and a final embodiment has the barrier mat dextral distal edge x-coordinate length (2352) is greater than the aperture diameter (2120) and the barrier mat dextral distal edge y-coordinate length (2354) is less than the aperture diameter (2120), while further embodiments incorporate any combinations thereof. In another embodiment at least two of the barrier mat sinistral proximal edge x-coordinate length (2322), the barrier mat dextral proximal edge x-coordinate length (2332), the barrier mat sinistral distal edge x-coordinate length (2342), and the barrier mat dextral distal edge x-coordinate length (2352) are substantially equal. Similarly, in a further embodiment at least two of the barrier mat sinistral proximal edge y-coordinate length (2324), the barrier mat dextral proximal edge y-coordinate length (2334), the barrier mat sinistral distal edge y-coordinate length (2344), and the barrier mat dextral distal edge y-coordinate length (2354) are substantially equal.

Another embodiment has exhibited even further improvements to safety and durability via the introduction of at least a distinct barrier mat sinistral edge (2300), having a barrier mat sinistral edge length (2305), and/or a barrier mat dextral edge (2310), having a barrier mat dextral edge length (2315), also seen in FIGS. 8 and 9, either, or both, of which may be substantially perpendicular to a long axis of the barrier mat (2000). In one embodiment the barrier mat sinistral edge length (2305) and/or the barrier mat dextral edge length (2315) is at least 15% of the aperture diameter (2120), and at least 25% in another embodiment, and at least 35% in still a further embodiment. However, a further series of embodiments exhibits additional benefits when the barrier mat sinistral edge length (2305) and/or the barrier mat dextral edge length (2315) is no more than 100% of the aperture diameter (2120), and no more than 90% in another embodiment, and no more than 75% in still a further embodiment. Additionally, in yet a further series of embodiments exhibits additional benefits when the barrier mat sinistral edge length (2305) and/or the barrier mat dextral edge length (2315) is no more than 100% of the largest of the sinistral proximal edge y-coordinate length (2324), the dextral proximal edge y-coordinate length (2334), the sinistral distal edge y-coordinate length (2344), and/or the dextral distal edge y-coordinate length (2354), and no more than 85% in another embodiment, and no more than 70% in still another embodiment.

The axis of the barrier mat sinistral proximal edge (2320) intersects with the axis of the barrier mat sinistral edge (2300) forming a barrier mat sinistral proximal edge to sinistral edge angle (2420). Additionally, the axis of the barrier mat dextral proximal edge (2330) intersects with the axis of the barrier mat dextral edge (2310) forming a barrier mat dextral proximal edge to dextral edge angle (2430). Furthermore, the axis of the barrier mat sinistral distal edge (2340) intersects with the axis of the barrier mat sinistral edge (2300) forming a barrier mat sinistral distal edge to sinistral edge angle (2440). Even furthermore, the axis of the barrier mat dextral distal edge (2350) intersects with the axis of the barrier mat dextral edge (2310) forming a barrier mat dextral distal edge to dextral edge angle (2450). In one embodiment one or more of the sinistral proximal edge to sinistral edge angle (2420), the dextral proximal edge to dextral edge angle (2430), the sinistral distal edge to sinistral edge angle (2440), and the dextral distal edge to dextral edge angle (2450), are obtuse, while in a further embodiment one or more of them are no greater than the sinistral distal edge to dextral distal edge angle (2460) and/or the sum of the sinistral proximal edge to installation slit angle (2400) and the dextral proximal edge to installation slit angle (2410). In another embodiment the sinistral distal edge to dextral distal edge angle (2460) is substantially equal to the sum of the sinistral proximal edge to installation slit angle (2400) and the dextral proximal edge to installation slit angle (2410). In a further embodiment the sinistral proximal edge to sinistral edge angle (2420) is substantially equal to the sinistral distal edge to sinistral edge angle (2440), and in still another embodiment the dextral proximal edge to dextral edge angle (2430) is substantially equal to the dextral distal edge to dextral edge angle (2450), The barrier mat thickness (2380), the density of the barrier mat (2000), and the stiffness of the barrier mat (2000) also play a significant role in the safety and durability of the barrier mat (2000). Such relationships must balance many competing factors so that the barrier mat (2000) is flexible enough so that a tire running over a portion of the barrier mat (2000) does not cause another portion to lift off the ground thereby increasing the likelihood that it is drawn into the blade or is caught on another tire, yet the thickness (2380) cannot be such as to interfere with the tires, the blade, or the mower deck, such factors often being in contradiction with the disclosed size and geometric relationships that provide improvements regarding mowing path deviations. Further, some embodiments of the barrier mat (2000) must be flexible enough to permit deformation in the vicinity of the installation slit (2200) to create a pathway for a lawn obstacle (O) to pass, while in one embodiment ensuring the edges adjacent to the installation slit (2200) are separated by a distance of less than 0.25", and no more than 0.125" in another embodiment, and in yet a further embodiment at least a portion of the edges adjacent to the installation slit (2200) are in contact with one another before and after installation around the obstacle (O). Therefore, as with the other relationships, seemingly unrelated relationships dramatically, and unexpectedly, increase the durability and safety of the barrier mat (2000). For instance, in one embodiment the barrier mat thickness (2380) is at least 5% of the aperture diameter (2120), while in another embodiment it is at least 7.5%, and is at least 10% in still a further embodiment. Yet a further series of embodiments balances the diminishing returns, and increased safety risks, associated with too great of a barrier mat thickness (2380), thus in one embodiment the barrier mat thickness (2380) is no more than 30% of the aperture diameter (2120), while in another embodiment it is no more than 25%, and is no more than 20% in still a further embodiment. In one embodiment the barrier mat thickness (2380) is at least 0.25", while in a further embodiment it is at least 0.50", while in still another embodiment it is no more than 1.25", and not more than 1.00" in yet another embodiment. In one embodiment the barrier mat thickness (2380) is constant throughout the entire barrier mat (2000), however in another embodiment the barrier mat thickness (2380) varies throughout the barrier mat (2000). In one embodiment the greatest barrier mat thickness (2380) is at the aperture, while in another embodiment the smallest barrier mat thickness (2380) is along the exterior perimeter, and in yet a further embodiment the barrier mat thickness (2380) at the installation slit (2200) is less than the barrier mat thickness (2380) at another point of the barrier mat (2000). Such relationships further promote flexibility of the barrier mat (2000) in areas most likely to be contacted by a mower, and stiffness in the vicinity of the obstacle, while balancing the requirements associated with the disclosed size and geometric relationships. One particular embodiment has a reduced thickness zone defined as the portion of the mat extending from the installation slit (2200) a distance of at least 25% of the aperture diameter (2120), wherein the barrier mat thickness (2380) throughout the reduced thickness zone is less than the barrier mat thickness (2380) at another point of the barrier mat (2000).

Further, in one embodiment the density of the barrier mat (2000) is at least 20 lb/cf per ASTM D-3676, while in a further embodiment the density is at least 35 lb/cf, and in still another embodiment it is at least 50 lb/cf. Another series of embodiments introduces upper limits to the density range whereby the density is no more than 100 lb/cf, while in a further embodiment the density is no more than 85 lb/cf, and in still another embodiment it is no more than 70 lb/cf. In one embodiment the Shore A hardness of the barrier mat (2000) is at least 40, while in another embodiment it is no more than 100, and in still a further embodiment it is 50-75. In another embodiment the shear modulus of the barrier mat (2000) is less than 0.5 GPa, while in another embodiment it is less than 0.15, and in still a further embodiment it is less than 0.10. The tensile strength of the barrier mat (2000) is preferably at least 2000 psi, and at least 3000 psi in another embodiment, and at least 4000 psi in yet a further embodiment. In one particular embodiment the barrier mat (2000) is composed of SBR bonded granular recycled rubber.

In the illustrated embodiments the barrier mat (2000) is a unitary, or single-piece, construction, however it may be constructed in multiple sections containing interlocking features that secure the individual sections. In such multi-section embodiments the barrier mat installation slit (2200) consists of the abutting edges of adjacent sections that contact each other.

Skirting Membrane (3000)

Figure 5:
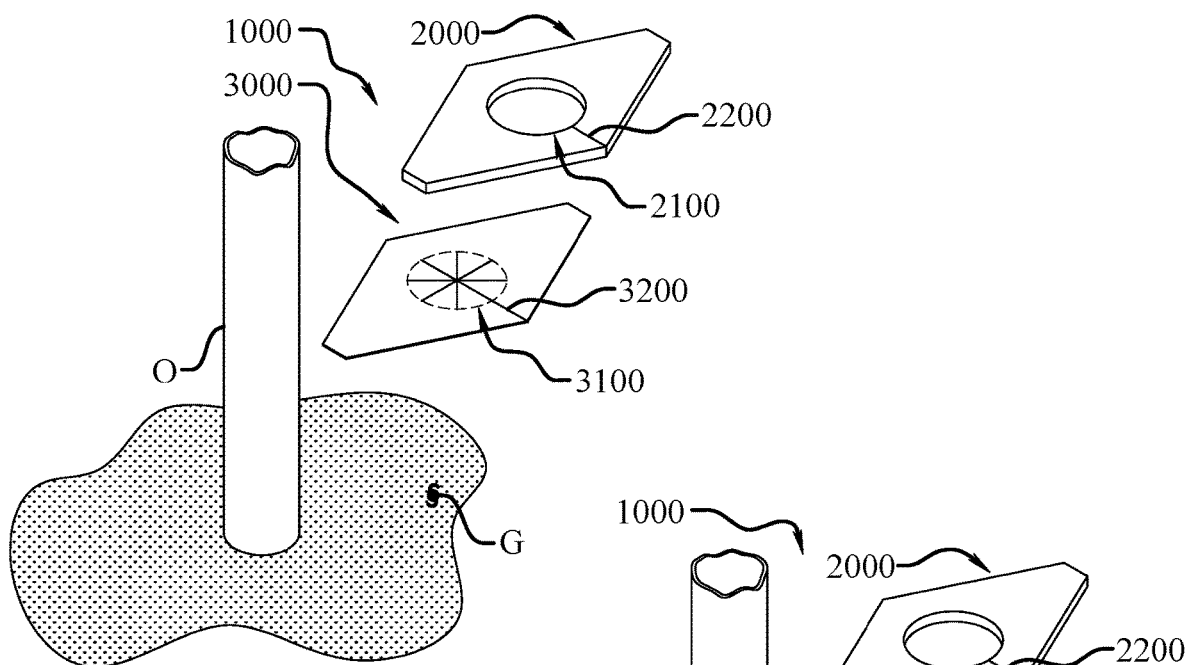
FIG. 5 is an isometric view of an embodiment of a mower path assistance system having a barrier mat and a skirting membrane, not to scale.
Figure 6:
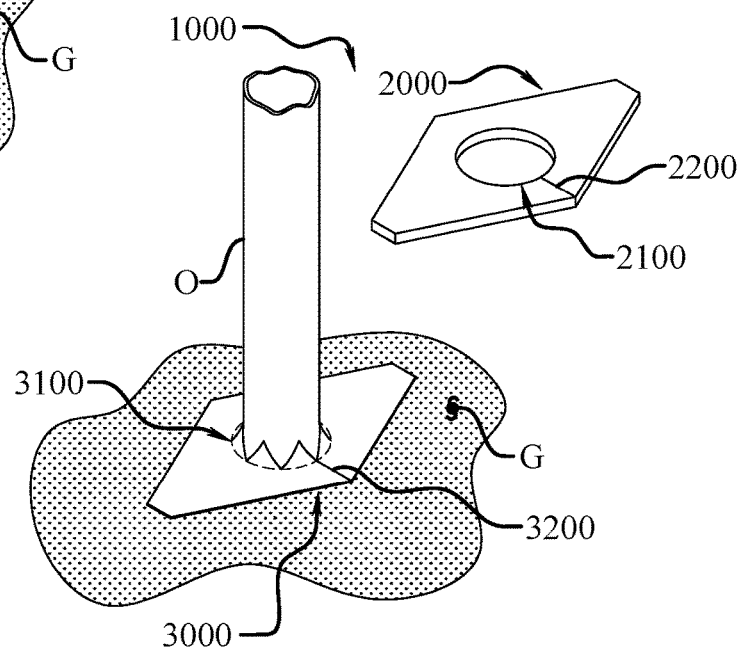
FIG. 6 is an isometric view of an embodiment of a mower path assistance system having a barrier mat and an installed skirting membrane, not to scale.
Figure 7:
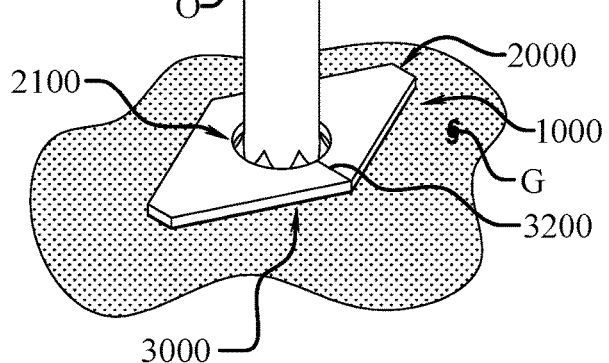
FIG. 7 is an isometric view of an embodiment of a mower path assistance system having an installed barrier mat and a skirting membrane, not to scale.

Now referring to FIGS. 5-7, in another embodiment, the barrier system (1000) comprises of a barrier mat (2000) and a skirting membrane (3000) having a variable opening aperture (3100) and a skirting membrane installation slit (3200). The skirting membrane (3000) maybe composed of any material that is more flexible than the barrier mat (2000), including, but not limited to, compositions including natural rubber (latex—grown from plants), synthetic rubber (made artificially in a chemical plant or laboratory) such as styrene butadiene (SBR), polyacrylics, polyvinyl acetate (PVA), polyvinyl chloride (PVC), polychloroprene (better known as neoprene), and various types of polyurethane, plastics, both natural and synthetic, including thermoplastics, thermosets, bioplastics made of natural materials such as those using natural materials such as grass, trees, and corn instead of fossil fuels, biodegradable plastics engineered to break down such as photodegradable and oxydegradable compositions, and eco/recycled plastics, as well as fabrics, paper products, composites including natural composites, fiber reinforced plastic, and polymer matrix composites, and laminates thereof. In one embodiment the skirting membrane (3000) is composed of material that is both water and air impermeable. In another embodiment majority, by volume, of the skirting membrane (3000) is composed a cork based material.

Figure 12:
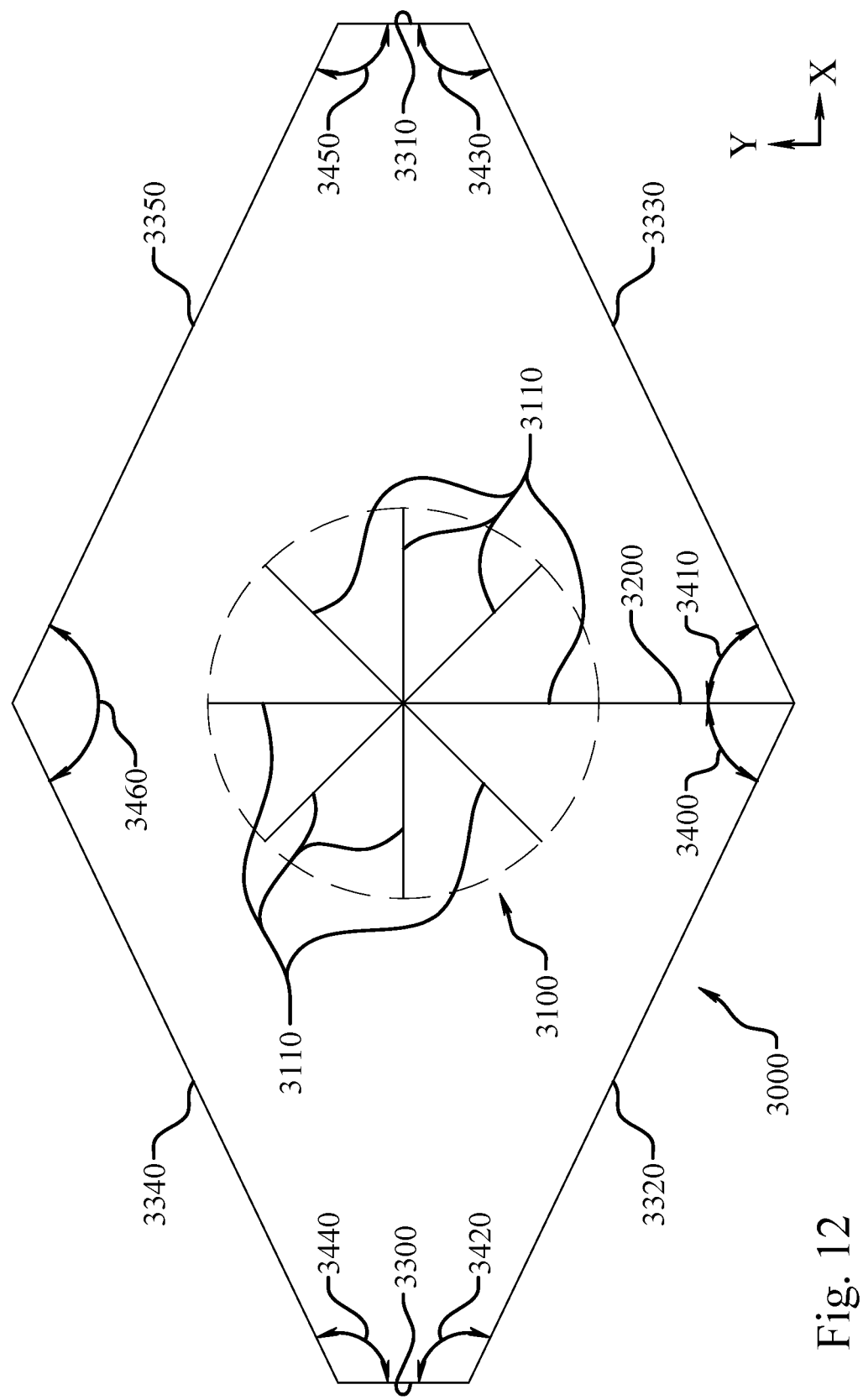
FIG. 12 is a top plan view of an embodiment of a skirting membrane, not to scale.
Figure 13:
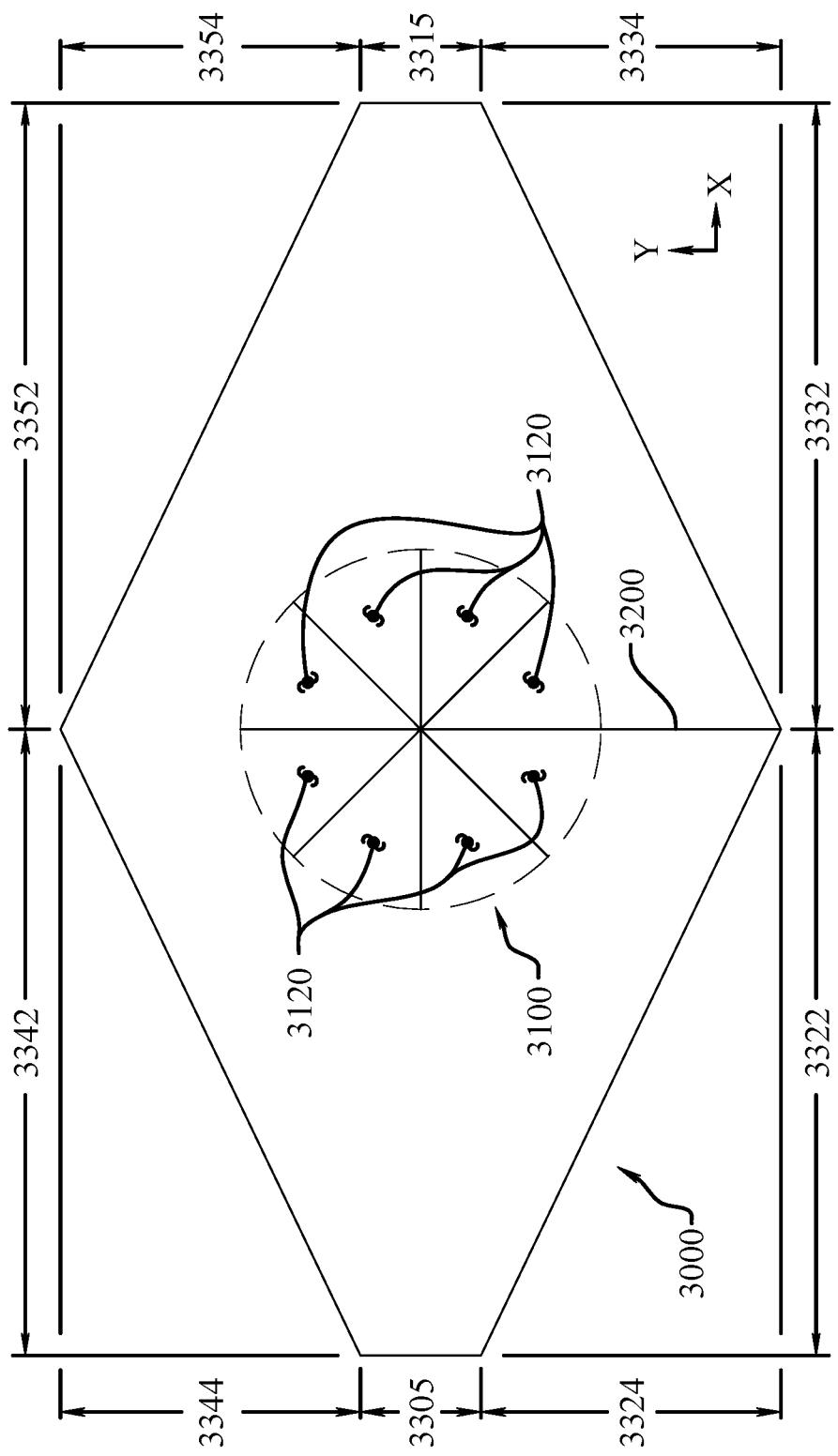
FIG. 13 is another top plan view of an embodiment of a skirting membrane, not to scale.

The skirting membrane installation slit (3200) extends from a perimeter edge to the skirting membrane (3000) and creates a pathway for a lawn obstacle (O) to pass when the skirting membrane (3000) is twisted or deformed. Furthermore, the pathway created by the skirting membrane installation slit (3200) leads to the variable opening aperture (3100). Once the lawn obstacle (O) is located inside of the variable opening aperture (3100), the skirting membrane (3000) is untwisted, multiple variable opening aperture slits (3110) form variable opening aperture area adjustment portions (3120), as illustrated in FIGS. 12 and 13, which are flexible and at least partially confirm to the sides of the lawn obstacle (O), which helps prevent grass (G) from growing up through the center of the barrier mat (2000) and allows the use of the skirting membrane (3000) with lawn obstacles (O) with various sizes and shapes. Next the skirting membrane (3000) is positioned in the desired orientation that maximizes mowing efficiency. After the skirting membrane (3000) and positioned, the barrier mat (2000) is installed and placed over the previously installed skirting membrane (3000), as seen in FIGS. 5-7. The skirting membrane (3000) further serves to reduce the movement of the barrier mat (2000) when contacted by a portion of the mower, as the skirting member (3000) produces a stronger interface with the ground, and the interface between the barrier mat (2000) and the skirting member (3000) is stronger than that of the barrier mat (2000) placed directly on the ground, further reducing movement of the barrier mat (2000).

In one particular embodiment directed to ensuring the structural stability of the variable opening aperture (3100), the maximum variable opening aperture diameter is no more than 75% greater than the initial variable opening aperture diameter, and no more than 50% greater in still another embodiment. One particular embodiment has the variable opening aperture diameter of at least 4", while in another embodiment it is at least 6", and in an even further embodiment it is at least 8". The variable opening aperture diameter is preferably less than 14" in one embodiment, and less than 12" in another embodiment, and less than 10" in yet a further embodiment. As previously disclosed, the variable opening aperture may be other geometries and in one embodiment covering all shapes the open area of the aperture is at least 12 in$^2$, and at least 26 in$^2$ in another embodiment, and at least 45 in$^2$ in still a further embodiment. Further, the open area of the variable opening aperture is preferable less than 155 in$^2$, and less than 115 in$^2$ in another embodiment, and less than 80 in$^2$ in yet another embodiment. The skirting membrane installation slit (3200) has a length that is preferably at least 25% of the variable opening aperture diameter, and at least 35% in another embodiment, and at least 50% in yet a further embodiment. However, another series of embodiments closes the upper bound of the range with the length of the skirting membrane installation slit (3200) being no more than the variable opening aperture diameter, and no more than 80% of the variable opening aperture diameter in a further embodiment, and no more than 75% of the variable opening aperture diameter in yet another embodiment.

Figure 14:
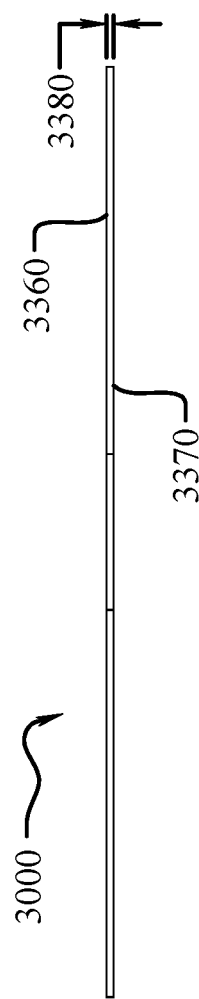
FIG. 14 is a left side elevation view of an embodiment of a skirting membrane, not to scale.
Figure 15:
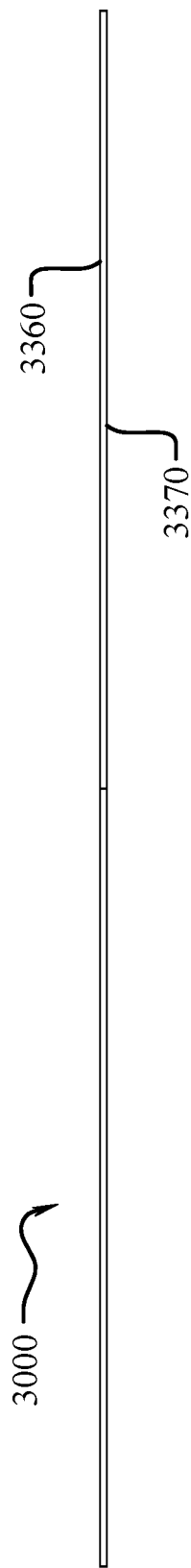
FIG. 15 is a front side elevation view of an embodiment of a skirting membrane, not to scale.

The skirting membrane (3000) has a skirting membrane top surface (3360), a skirting membrane bottom surface (3370), and a skirting membrane thickness (3380), as seen in FIGS. 14 and 15. In one embodiment the skirting membrane (3000) is substantially oval and therefore has a continuous perimeter edge, and in one oval embodiment a maximum length dimension is at least 1.5 times a maximum width dimension, which is measure perpendicular to the maximum length dimension, and thus having an aspect ratio, the maximum length divided by the maximum width, of at least 1.5, while in another embodiment the aspect ratio is at least 2.0, and in still a further embodiment the aspect ratio is at least 2.5. It is important to note that such aspect ratios apply equally regardless of whether the skirting membrane (3000) is substantially oval in shape or any other shape, such as the illustrated embodiments having distinct sidewall edges. In another embodiment the aspect ratio is no more than 5.0, while in a further embodiment the aspect ratio is no more than 4.0, and in yet another embodiment the aspect ratio is no more than 3.0. Such aspect ratios have provided unexpected results by significantly reducing the likelihood of the skirting membrane (3000) being drawn up into the blade or wheels of a mower as it passes over a portion of the skirting membrane (3000). In a further embodiment at least one of the skirting membrane top surface (3360) and/or the skirting membrane bottom surface (3370) is textured and has an average roughness (Sa) value of greater than 15 μm, and greater than greater than 50 μm in another embodiment, and greater than 75 μm in yet another embodiment. In a further embodiment the barrier mat bottom surface (2370) is textured and has an average roughness (Sa) value of greater than 15 μm, and greater than greater than 50 μm in another embodiment, and greater than 75 μm in yet another embodiment.

Therefore, in one embodiment the skirting membrane (3000) includes as least four distinct sidewall edges, namely, as seen in FIGS. 12 and 13, a skirting membrane sinistral proximal edge (3320), having a skirting membrane sinistral proximal edge x-coordinate length (3322) and a skirting membrane sinistral proximal edge y-coordinate length (3324); a skirting membrane dextral proximal edge (3330), having a skirting membrane dextral proximal edge x-coordinate length (3332) and a skirting membrane dextral proximal edge y-coordinate length (3334); a skirting membrane sinistral distal edge (3340), having a skirting membrane sinistral distal edge x-coordinate length (3342) and a skirting membrane sinistral distal edge y-coordinate length (3344); a skirting membrane dextral distal edge (3350), having a skirting membrane dextral distal edge x-coordinate length (3352) and a skirting membrane dextral distal edge y-coordinate length (3354). One skilled in the art will appreciate that this embodiment is similar to that of FIGS. 12 and 13 but without the separate and distinct skirting membrane sinistral edge (3300) and skirting membrane dextral edge (3310), rather the skirting membrane sinistral proximal edge (3320) may join the skirting membrane sinistral distal edge (3340) via a smooth radiused transition or a sharp intersection, and the skirting membrane dextral proximal edge (3330) may join the skirting membrane dextral distal edge (3350) via a smooth radiused transition or a sharp intersection. Thus, one skilled in the art will further recognize that in such a symmetrical embodiment the aspect ratio is accordingly the sum of the skirting membrane sinistral proximal edge x-coordinate length (3322) and the skirting membrane dextral proximal edge x-coordinate length (3332) divided by the sum of the skirting membrane sinistral proximal edge y-coordinate length (3324) and the skirting membrane sinistral distal edge y-coordinate length (3344), although asymmetric embodiments are included in this disclosure. Regardless of the symmetry, in this embodiment at least one angle between two of the edges is obtuse. For example, as seen in FIG. 12, an axis of the skirting membrane sinistral distal edge (3340) intersects with the axis of the skirting membrane distal edge (3350) and forms a skirting membrane sinistral distal edge to dextral distal edge angle (3460) that is greater than 90 degrees. In this embodiment the axes are easily defined because the edges are straight, however in embodiments having curved edges, each point along the edge has a tangent line defining a tangency angle, and an average of all the tangency angles establishes the axis for the associated edge. Likewise, on the opposite side of FIG. 12, the angle between the skirting membrane sinistral proximal edge (3320) and the skirting membrane dextral proximal edge (3330) is the sum of a skirting membrane sinistral proximal edge to installation slit angle (3400) and a skirting membrane dextral proximal edge to installation slit angle (3410), and in one embodiment this sum angle is an obtuse angle. In a further embodiment at least one of the skirting membrane sinistral proximal edge to installation slit angle (3400) and the skirting membrane dextral proximal edge to installation slit angle (3410) are acute, while in yet another embodiment both the skirting membrane sinistral proximal edge to installation slit angle (3400) and the skirting membrane dextral proximal edge to installation slit angle (3410) are acute. In further embodiments any of the disclosed obtuse angles are at least 100 degrees, while in still further embodiments any of the disclosed obtuse angles are at least 110 degrees, and in yet more embodiments any of the disclosed obtuse angles are at least 120 degrees. In even more variations, any of the disclosed obtuse angles are no more than 170 degrees, while in still further embodiments any of the disclosed obtuse angles are no more than 160 degrees, and in yet more embodiments any of the disclosed obtuse angles are no more than 150 degrees. Unlike conventional circular or rectangular weed barriers that tend to be caught on mower tires or drawn into the blade due in part to edge orientation, stiffness, thickness, and light weight, just to name a few, the orientation and relationships of the present edges and angles significantly reduce the likelihood of such instances occurring since the tire and mowing deck do not first encounter the barrier mat (2000) at a ninety degree angle.

One embodiment has the skirting membrane sinistral proximal edge x-coordinate length (3322) being at least 50% greater than the skirting membrane sinistral proximal edge y-coordinate length (3324); similarly another embodiment has the skirting membrane sinistral distal edge x-coordinate length (3342) being at least 50% greater than the skirting membrane sinistral distal edge y-coordinate length (3344); similarly yet a further embodiment has the skirting membrane dextral proximal edge x-coordinate length (3332) being at least 50% greater than the skirting membrane dextral proximal edge y-coordinate length (3334); and a final embodiment has the skirting membrane dextral distal edge x-coordinate length (3352) being at least 50% greater than the skirting membrane dextral distal edge y-coordinate length (3354), while further embodiments incorporate any combinations thereof. Still further embodiments uniquely cap the upper end of these relationships to further ensure stability and safety of the skirting membrane (3000). For example, in one embodiment has the skirting membrane sinistral proximal edge x-coordinate length (3322) is no more than 200% greater than the skirting membrane sinistral proximal edge y-coordinate length (3324); similarly another embodiment has the skirting membrane sinistral distal edge x-coordinate length (3342) is no more than 200% greater than the skirting membrane sinistral distal edge y-coordinate length (3344); similarly yet a further embodiment has the skirting membrane dextral proximal edge x-coordinate length (3332) is no more than 200% greater than the skirting membrane dextral proximal edge y-coordinate length (3334); and a final embodiment has the skirting membrane dextral distal edge x-coordinate length (3352) is no more than 200% greater than the skirting membrane dextral distal edge y-coordinate length (3354), while further embodiments incorporate any combinations thereof. In still another embodiment these benefits are enhanced when the skirting membrane sinistral proximal edge x-coordinate length (3322) is greater than the skirting membrane aperture diameter and the skirting membrane sinistral proximal edge y-coordinate length (3324) is less than the skirting membrane aperture diameter; similarly another embodiment has the skirting membrane sinistral distal edge x-coordinate length (3342) greater than the skirting membrane aperture diameter and the skirting membrane sinistral distal edge y-coordinate length (3344) is less than the skirting membrane aperture diameter; similarly yet a further embodiment has the skirting membrane dextral proximal edge x-coordinate length (3332) is greater than the skirting membrane aperture diameter and the skirting membrane dextral proximal edge y-coordinate length (3334) is less than the skirting membrane aperture diameter; and a final embodiment has the skirting membrane dextral distal edge x-coordinate length (3352) is greater than the skirting membrane aperture diameter and the skirting membrane dextral distal edge y-coordinate length (3354) is less than the skirting membrane aperture diameter, while further embodiments incorporate any combinations thereof. In another embodiment at least two of the skirting membrane sinistral proximal edge x-coordinate length (3322), the skirting membrane dextral proximal edge x-coordinate length (3332), the skirting membrane sinistral distal edge x-coordinate length (3342), and the skirting membrane dextral distal edge x-coordinate length (3352) are substantially equal. Similarly, in a further embodiment at least two of the skirting membrane sinistral proximal edge y-coordinate length (3324), the skirting membrane dextral proximal edge y-coordinate length (3334), the skirting membrane sinistral distal edge y-coordinate length (3344), and the skirting membrane dextral distal edge y-coordinate length (3354) are substantially equal.

Another embodiment has exhibited even further improvements to safety and durability via the introduction of at least a distinct skirting membrane sinistral edge (3300), having a skirting membrane sinistral edge length (3305), and/or a skirting membrane dextral edge (3310), having a skirting membrane dextral edge length (3315), also seen in FIGS. 12 and 13, either, or both, of which may be substantially perpendicular to a long axis of the skirting membrane (3000). In one embodiment the skirting membrane sinistral edge length (3305) and/or the skirting membrane dextral edge length (3315) is at least 15% of the skirting membrane aperture diameter, and at least 25% in another embodiment, and at least 35% in still a further embodiment. However, a further series of embodiments exhibits additional benefits when the skirting membrane sinistral edge length (3305) and/or the skirting membrane dextral edge length (3315) is no more than 100% of the skirting membrane aperture diameter, and no more than 90% in another embodiment, and no more than 75% in still a further embodiment. Additionally, in yet a further series of embodiments exhibits additional benefits when the skirting membrane sinistral edge length (3305) and/or the skirting membrane dextral edge length (3315) is no more than 100% of the largest of the sinistral proximal edge y-coordinate length (3324), the dextral proximal edge y-coordinate length (3334), the sinistral distal edge y-coordinate length (3344), and/or the dextral distal edge y-coordinate length (3354), and no more than 85% in another embodiment, and no more than 70% in still another embodiment.

Figure 16:
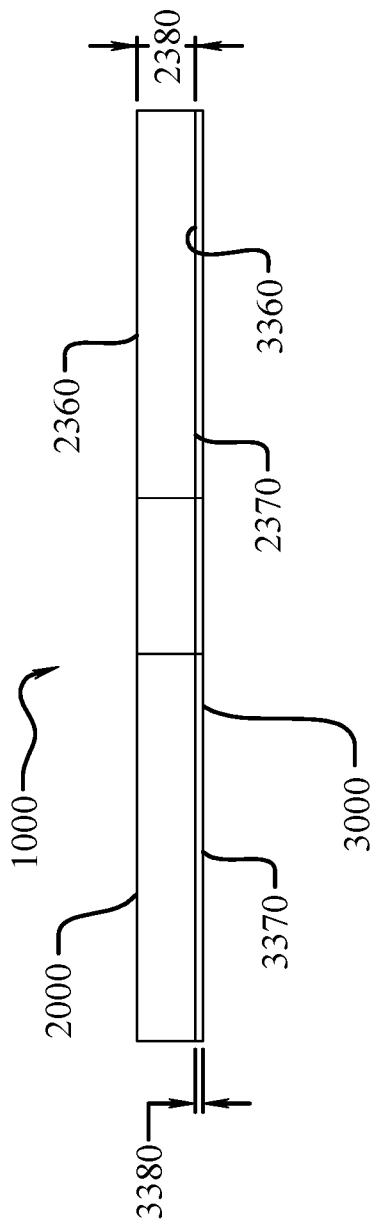
FIG. 16 is a left side elevation view of an embodiment of a mower path assistance system having a barrier mat and a bonded skirting membrane, not to scale.
Figure 17:
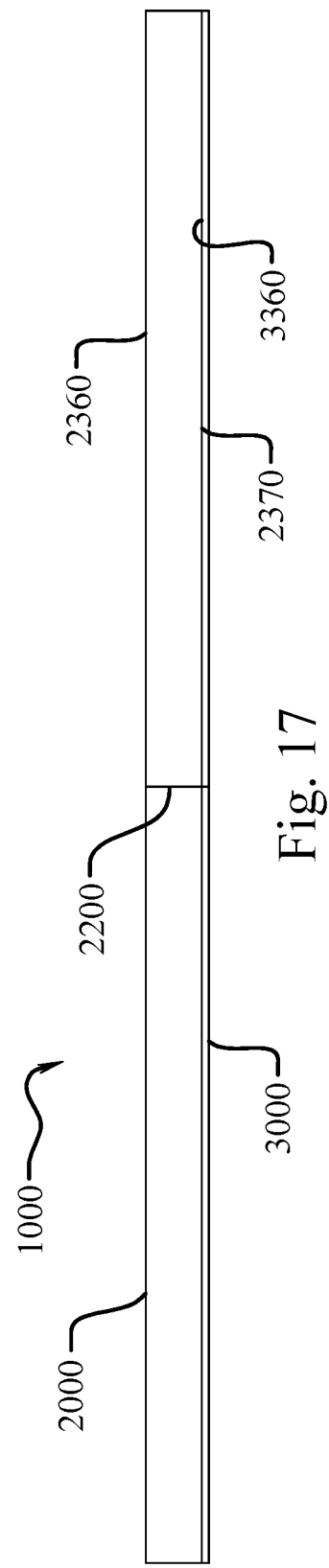
FIG. 17 is a front side elevation view of an embodiment of a mower path assistance system having a barrier mat and a bonded skirting membrane, not to scale.
Figure 18:
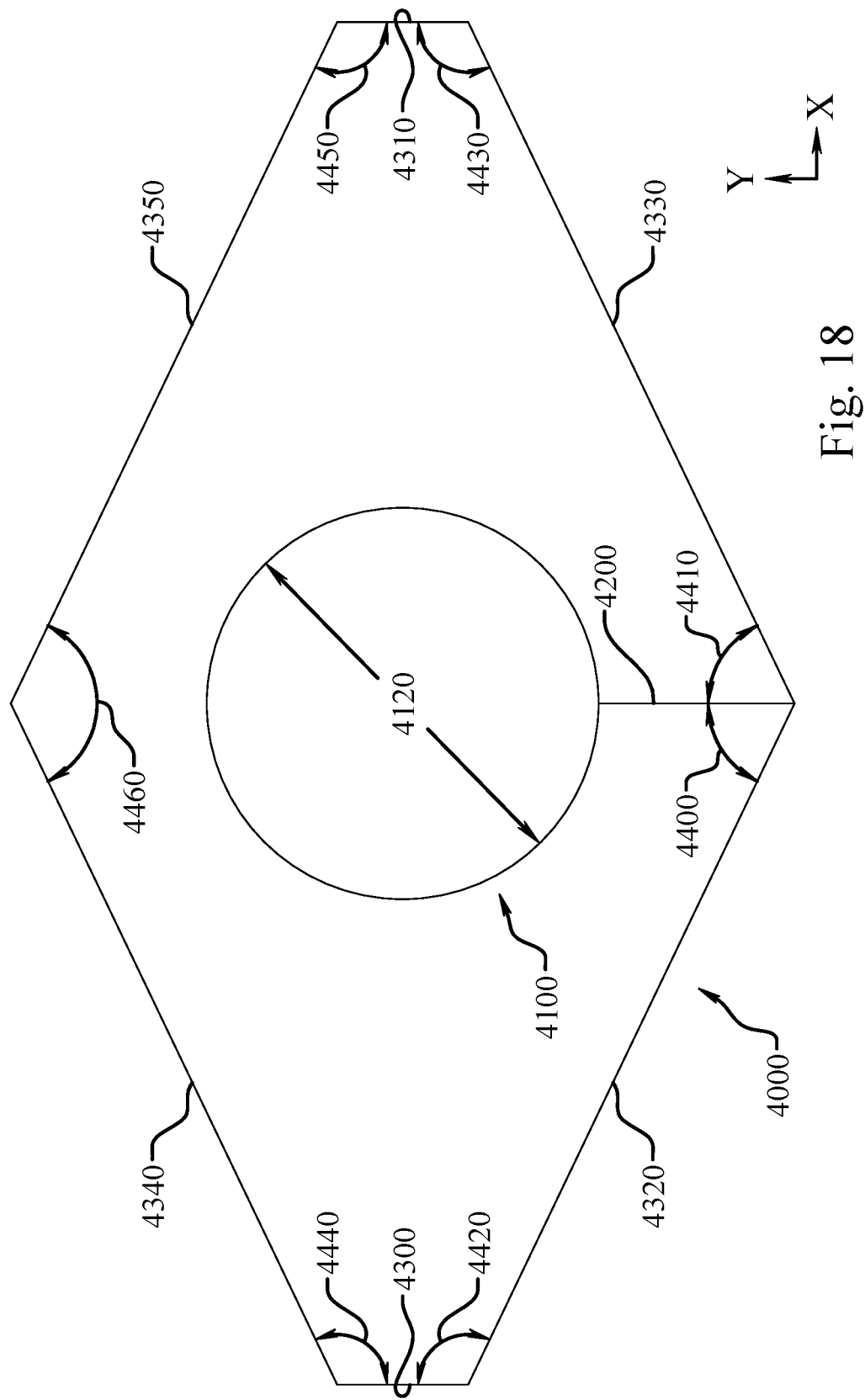
FIG. 18 is a top plan view of an embodiment of an herbicide layer, not to scale.
Figure 19:
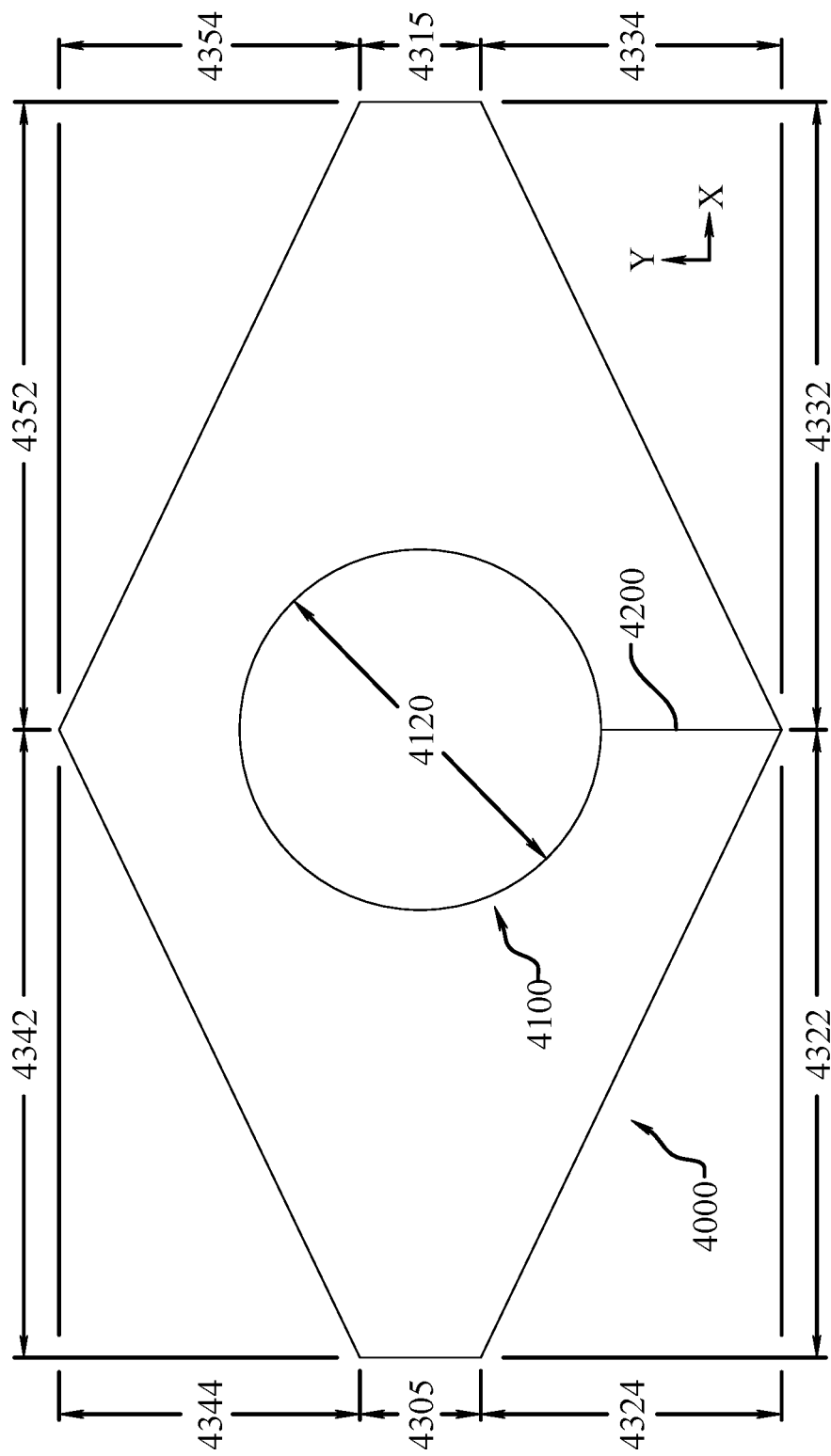
FIG. 19 is another top plan view of an embodiment of an herbicide layer, not to scale.
Figure 22:
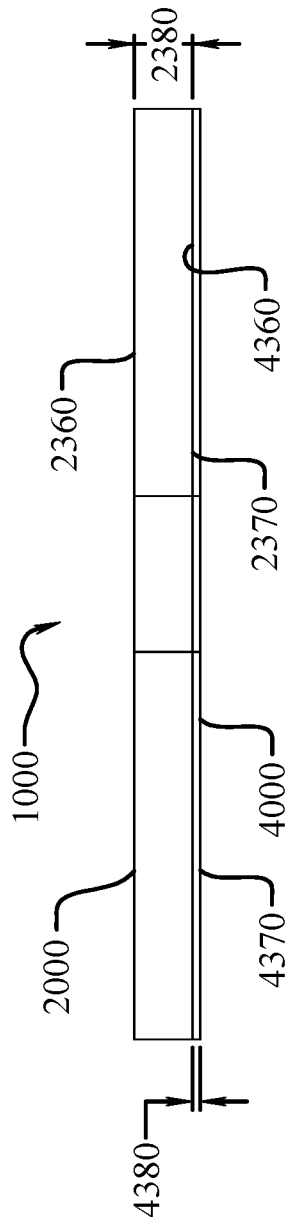
FIG. 22 is a left side elevation view of an embodiment of a mower path assistance system having a barrier mat and a bonded herbicide layer, not to scale.
Figure 23:
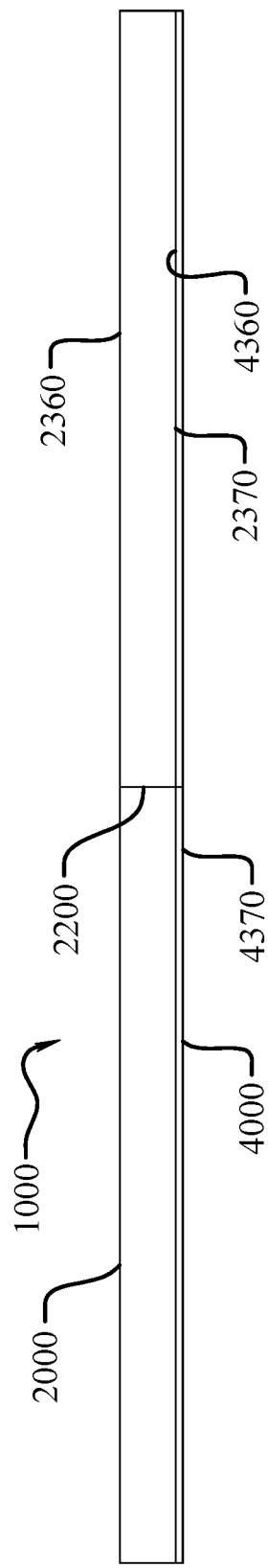
FIG. 23 is a front side elevation view of an embodiment of a mower path assistance system having a barrier mat and a bonded herbicide layer, not to scale.
Figure 24:
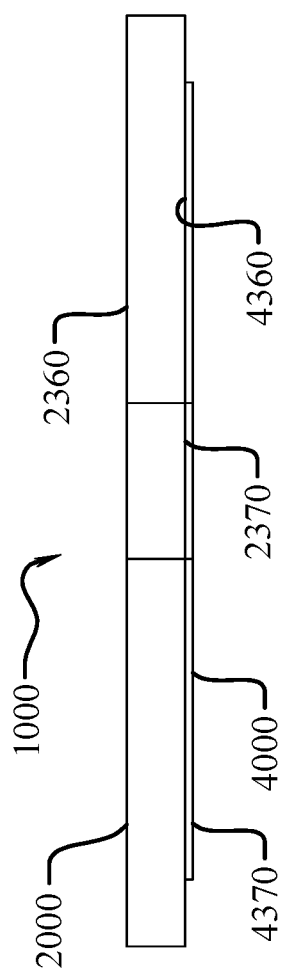
FIG. 24 is a left side elevation view of an embodiment of a mower path assistance system having a barrier mat and a bonded recessed herbicide layer, not to scale.
Figure 25:
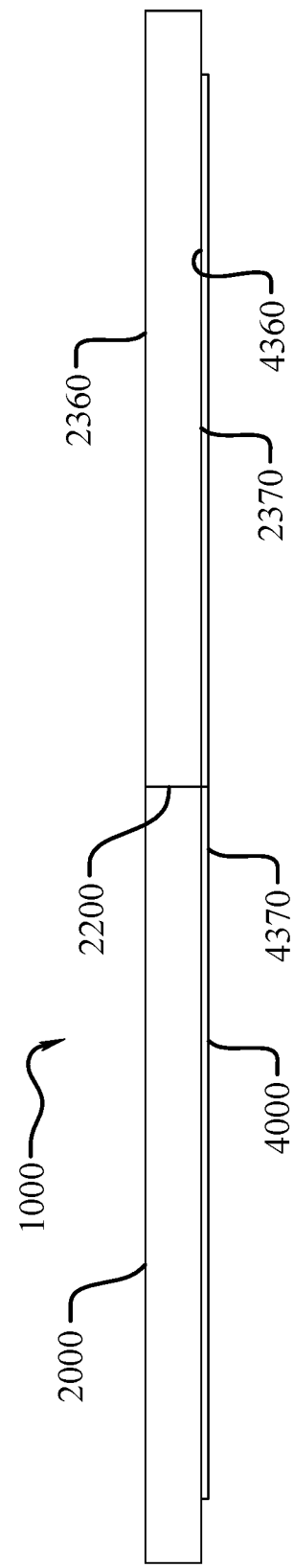
FIG. 25 is a front side elevation view of an embodiment of a mower path assistance system having a barrier mat and a bonded recessed herbicide layer, not to scale.

The axis of the skirting membrane sinistral proximal edge (3320) intersects with the axis of the skirting membrane mat sinistral edge (3300) forming a skirting membrane sinistral proximal edge to sinistral edge angle (3420). Additionally, the axis of the skirting membrane dextral proximal edge (3330) intersects with the axis of the skirting membrane dextral edge (3310) forming a skirting membrane dextral proximal edge to dextral edge angle (3430). Furthermore, the axis of the skirting membrane sinistral distal edge (3340) intersects with the axis of the skirting membrane sinistral edge (3300) forming a skirting membrane sinistral distal edge to sinistral edge angle (3440). Even furthermore, the axis of the skirting membrane dextral distal edge (3350) intersects with the axis of the skirting membrane dextral edge (3310) forming a skirting membrane dextral distal edge to dextral edge angle (3450). In one embodiment one or more of the sinistral proximal edge to sinistral edge angle (3420), the dextral proximal edge to dextral edge angle (3430), the sinistral distal edge to sinistral edge angle (3440), and the dextral distal edge to dextral edge angle (3450), are obtuse, while in a further embodiment one or more of them are no greater than the sinistral distal edge to dextral distal edge angle (3460) and/or the sum of the sinistral proximal edge to installation slit angle (3400) and the dextral proximal edge to installation slit angle (3410). In another embodiment the sinistral distal edge to dextral distal edge angle (3460) is substantially equal to the sum of the sinistral proximal edge to installation slit angle (3400) and the dextral proximal edge to installation slit angle (3410). In a further embodiment the sinistral proximal edge to sinistral edge angle (3420) is substantially equal to the sinistral distal edge to sinistral edge angle (3440), and in still another embodiment the dextral proximal edge to dextral edge angle (3430) is substantially equal to the dextral distal edge to dextral edge angle (3450), The skirting membrane thickness (3380), the density of the skirting membrane (3000), and the stiffness of the skirting membrane (3000) also play a significant role in the safety and durability of the skirting membrane (3000). Such relationships must balance many competing factors so that the skirting membrane (3000) is flexible enough so that a tire running over a portion of the skirting membrane (3000) does not cause another portion to lift off the ground thereby increasing the likelihood that it is drawn into the blade or is caught on another tire, yet the thickness (3380) cannot be such as to interfere with the tires, the blade, or the mower deck. Further, some embodiments of the skirting membrane (3000) must be flexible enough to permit deformation in the vicinity of the installation slit (3200) to create a pathway for a lawn obstacle (O) to pass, while in one embodiment ensuring the edges adjacent to the installation slit (3200) are separated by a distance of less than 0.25", and no more than 0.125" in another embodiment, and in yet a further embodiment at least a portion of the edges adjacent to the installation slit (3200) are in contact with one another before and after installation around the obstacle (O). Therefore, as with the other relationships, seemingly unrelated relationships dramatically, and unexpectedly, increase the durability and safety of the skirting membrane (3000). For instance, in one embodiment the skirting membrane thickness (3380) is at least 1% of the skirting membrane aperture diameter, while in another embodiment it is at least 2%, and is at least 3% in still a further embodiment. Yet a further series of embodiments balances the diminishing returns, and increased safety risks, associated with too great of a skirting membrane thickness (3380), thus in one embodiment the skirting membrane thickness (3380) is no more than 30% of the aperture diameter, while in another embodiment it is no more than 25%, and is no more than 20% in still a further embodiment. In one embodiment the skirting membrane thickness (3380) is at least 0.0625", while in a further embodiment it is at least 0.1250", while in still another embodiment it is no more than 0.375", and not more than 0.250" in yet another embodiment. In one embodiment the skirting membrane thickness (2380) is constant throughout the entire skirting membrane (3000), however in another embodiment the skirting membrane thickness (3380) varies throughout the skirting membrane (3000). In one embodiment the greatest skirting membrane thickness (3380) is at the aperture, while in another embodiment the smallest skirting membrane thickness (3380) is along the exterior perimeter, and in yet a further embodiment the skirting membrane thickness (3380) at the installation slit (3200) is less than the skirting membrane thickness (3380) at another point of the skirting membrane (3000). One particular embodiment has a reduced thickness zone defined as the portion of the skirting membrane extending from the installation slit (3200) a distance of at least 25% of the skirting membrane aperture diameter, wherein the skirting membrane thickness (3380) throughout the reduced thickness zone is less than the skirting membrane thickness (3380) at another point of the skirting membrane (3000). In yet a further embodiment the skirting membrane thickness (3380) is no more than 15% of the barrier mat thickness (2380), while it is no more than 12.5% in another embodiment, and no more than 10% in still a further embodiment. Further, in one embodiment the density of the skirting membrane (3000) is less than the density of the barrier mat (2000), while in a further embodiment the density of the skirting membrane (3000) at least 25% less is less than the density of the barrier mat (2000), and in an even further embodiment it is at least 50% less. In another embodiment, the barrier system (1000) comprises a barrier mat (2000) and a skirting membrane (3000), wherein the barrier mat (2000) and skirting membrane (3000) have approximately the same dimensions, and majority of the skirting membrane top surface (3360) is permanently bonded to the barrier mat bottom surface (2370), as illustrated in FIGS. 16 and 17. These relationships are critical and establish adequate flexibility of the skirting membrane (3000) to engage the obstacle and the barrier mat (2000), contact area with the barrier mat (2000), and retain the barrier mat (2000) as the driving element to keep the barrier system (1000) secure and in place while allowing some movement with respect to the obstacle while providing an improved contact relationship with the obstacle.

In the illustrated embodiments the skirting membrane (3000) is a unitary, or single-piece, construction, however it may be constructed in multiple sections containing interlocking features that secure the individual sections. In such multi-section embodiments the membrane installation slit (3200) consists of the abutting edges of adjacent sections that contact each other.

Herbicide Layer (4000)

In another embodiment, the barrier system (1000) comprises of a barrier mat (2000) and an herbicide layer (4000), as seen in FIGS. 18-29, and may also include the skirting membrane (3000). All of the disclosure related to the skirting membrane (3000) applies equally to the herbicide layer (4000), but with element numbers in the 4000 series rather than the 3000 series. All of the disclosure will not be repeated, but is incorporated by reference with 4000 series element numbers in lieu of 3000 series element numbers, and the words "herbicide layer" in lieu of "skirting membrane." The herbicide layer (4000) maybe composed of, but not limited to, cloth, or an organic polymer that is impregnated with an herbicide to kill, or suppress growth, of vegetation located under the herbicide layer (4000). The herbicide maybe, but not limited to, glyphosate compounds, acetochlor compounds, amitrole compounds, atrazine compounds, propanil compounds, and/or any other vegetation suppression compounds.

Various anchoring devices such as, but limited to, stakes, spikes, staples maybe used to anchor the barrier system (1000) to the ground. This provides the added benefits of preventing the barrier system (1000) from moving due to wind, high water, and deflection caused by the mower. In one embodiment the barrier mat (2000) includes at least two anchor apertures located on opposite sides of the barrier mat installation slit (2200), while in a further embodiment each of the anchor apertures are located a distance from the barrier mat installation slit (2200) that is no more than the barrier mat aperture diameter (2120). In another embodiment the length of each anchoring device is at least 50% of the barrier mat aperture diameter (2120), while in a further embodiment they are at least 75% of the barrier mat aperture diameter (2120).

Numerous alterations, modifications, and variations of the preferred embodiments disclosed herein will be apparent to those skilled in the art and they are all anticipated and contemplated to be within the spirit and scope of the application. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations are described herein, it is to be understood that the practice of such additional modifications and variations and the equivalents thereof, are within the spirit and scope of the invention.

I claim:

1. A mower path assistance system (1000) to encircle an obstacle projecting from a ground surface, comprising,
    a barrier mat (2000) formed with a barrier mat aperture (2100) enclosed by the barrier mat (2000) and having a barrier mat aperture diameter (2120), a perimeter edge, and a barrier mat installation slit (2200) extending from the perimeter edge to the barrier mat aperture (2100), wherein the barrier mat installation slit (2200) has a length that is 25-100% of the aperture diameter (2120) and the barrier mat (2000) is deformable around the barrier mat installation slit (2200) to create a pathway having a pathway width, that is no more than the barrier mat aperture diameter (2120), through which the obstacle may pass from the perimeter to the barrier mat aperture (2100);
    the barrier mat (2000) having at least a barrier mat sinistral proximal edge (2320), a barrier mat dextral proximal edge (2330), a barrier mat sinistral distal edge (2340), and a barrier mat dextral distal edge (2350), wherein a barrier mat sinistral distal edge axis intersects a barrier dextral distal edge axis at a barrier mat sinistral distal edge to dextral distal edge angle (2460) that is obtuse and at least 100 degrees and no more than 170 degrees, and a barrier mat sinistral proximal edge axis intersects a barrier dextral proximal edge axis at a barrier mat sinistral proximal edge to dextral proximal edge angle (2470) that is obtuse and at least 100 degrees and no more than 170 degrees;
    the barrier mat (2000) has a barrier mat top surface (2360), a barrier mat bottom surface (2370), and a barrier mat thickness (2380) that is 0.25"-1.25"; and
    the barrier mat (2000) is formed of a flexible water impermeable material having a density of at least 20 lb/cf, a Shore A hardness of 40-100, a shear modulus of less than 0.5 GPa, and a tensile strength of at least 2000 psi.

2. The system of claim 1, wherein the barrier mat sinistral proximal edge (2320) has a barrier mat sinistral proximal edge x-coordinate length (2322) and a barrier mat sinistral proximal edge y-coordinate length (2324), the barrier mat dextral proximal edge (2330) has a barrier mat dextral proximal edge x-coordinate length (2332) and a barrier mat dextral proximal edge y-coordinate length (2334), the barrier mat sinistral distal edge (2340) has a barrier mat sinistral distal edge x-coordinate length (2342) and a barrier mat sinistral distal edge y-coordinate length (2344), and the barrier mat dextral distal edge (2350) has a barrier mat dextral distal edge x-coordinate length (2352) and a barrier mat dextral distal edge y-coordinate length (2354), wherein the barrier mat sinistral proximal edge x-coordinate length (2322) is at least 50% greater than the barrier mat sinistral proximal edge y-coordinate length (2324), the barrier mat sinistral distal edge x-coordinate length (2342) is at least 50% greater than the barrier mat sinistral distal edge y-coordinate length (2344), the barrier mat dextral proximal edge x-coordinate length (2332) is at least 50% greater than the barrier mat dextral proximal edge y-coordinate length (2334), and the barrier mat dextral distal edge x-coordinate length (2352) is at least 50% greater than the barrier mat dextral distal edge y-coordinate length (2354).

3. The system of claim 2, wherein the barrier mat sinistral proximal edge x-coordinate length (2322) is 50-200% greater than the barrier mat sinistral proximal edge y-coordinate length (2324), the barrier mat sinistral distal edge x-coordinate length (2342) is 50-200% greater than the barrier mat sinistral distal edge y-coordinate length (2344), the barrier mat dextral proximal edge x-coordinate length (2332) is 50-200% greater than the barrier mat dextral proximal edge y-coordinate length (2334), and the barrier mat dextral distal edge x-coordinate length (2352) is 50-200% greater than the barrier mat dextral distal edge y-coordinate length (2354).

4. The system of claim 2, wherein the barrier mat sinistral proximal edge x-coordinate length (2322) is greater than the aperture diameter (2120) and the barrier mat sinistral proximal edge y-coordinate length (2324) is less than the aperture diameter (2120), the barrier mat sinistral distal edge x-coordinate length (2342) greater than the aperture diameter (2120) and the barrier mat sinistral distal edge y-coordinate length (2344) is less than the aperture diameter (2120), the barrier mat dextral proximal edge x-coordinate length (2332) is greater than the aperture diameter (2120) and the barrier mat dextral proximal edge y-coordinate length (2334) is less than the aperture diameter (2120), and the barrier mat dextral distal edge x-coordinate length (2352) is greater than the aperture diameter (2120) and the barrier mat dextral distal edge y-coordinate length (2354) is less than the aperture diameter (2120).

5. The system of claim 2, wherein at least two of the barrier mat sinistral proximal edge x-coordinate length (2322), the barrier mat dextral proximal edge x-coordinate length (2332), the barrier mat sinistral distal edge x-coordinate length (2342), the barrier mat dextral distal edge x-coordinate length (2352) are substantially equal, the barrier mat sinistral distal edge to dextral distal edge angle (2460) is no more than 150 degrees, and the barrier mat sinistral proximal edge to dextral proximal edge angle (2470) is no more than 150 degrees.

6. The system of claim 5, wherein at least two of the barrier mat sinistral proximal edge y-coordinate length (2324), the barrier mat dextral proximal edge y-coordinate length (2334), the barrier mat sinistral distal edge y-coordinate length (2344), and the barrier mat dextral distal edge y-coordinate length (2354) are substantially equal.

7. The system of claim 2, further including a barrier mat sinistral edge (2300), having a barrier mat sinistral edge length (2305) that is at least 15% of the aperture diameter (2120), and a barrier mat dextral edge (2310) substantially parallel to the barrier mat sinistral edge (2300), having a barrier mat dextral edge length (2315) that is at least 15% of the aperture diameter (2120).

8. The system of claim 7, wherein the barrier mat sinistral edge length (2305) is 15-90% of the aperture diameter (2120), and the barrier mat dextral edge length (2315) is 15-90% of the aperture diameter (2120).

9. The system of claim 8, wherein the barrier mat sinistral edge length (2305) and the barrier mat dextral edge length (2315) are no more than 100% of the largest of the sinistral proximal edge y-coordinate length (2324), the dextral proximal edge y-coordinate length (2334), the sinistral distal edge y-coordinate length (2344), and the dextral distal edge y-coordinate length (2354).

10. The system of claim 2, wherein the barrier mat thickness (2380) is no more than 1.00".

11. The system of claim 10, wherein the barrier mat thickness (2380) is constant throughout the entire barrier mat (2000).

12. The system of claim 1, wherein the barrier mat (2000) has a barrier mat top surface (2360), a barrier mat bottom surface (2370), and a barrier mat thickness (2380) that varies with a greatest barrier mat thickness (2380) at the barrier mat aperture (2100).

13. The system of claim 1, wherein the barrier mat (2000) has an aspect ratio of a maximum length divided by a maximum width that is 1.5-5.0.

14. The system of claim 13, wherein the aspect ratio is 2.0-4.0.

15. The system of claim 1, further including a skirting membrane (3000) in contact with the barrier mat bottom surface (2370), the skirting membrane (3000) having a variable opening aperture (3100), enclosed by the skirting membrane (3000) and having a variable opening aperture diameter (3120), and a skirting membrane installation slit (3200), a perimeter edge, and a skirting membrane installation slit (3200) extending from the perimeter edge to the variable opening aperture (3100), wherein the a skirting membrane (3000) is deformable around the skirting membrane installation slit (3200) to create a membrane pathway having a membrane pathway width, that is no more than the variable opening aperture diameter (3120), through which the obstacle may pass from the membrane perimeter to the variable opening aperture (3100), the skirting membrane (3000) having a skirting membrane top surface (3360), a skirting membrane bottom surface (3370), and a skirting membrane thickness (3380), wherein the skirting membrane installation slit (3200) has a length that is 25-100% of the variable opening aperture diameter (3120), the skirting membrane thickness (3380) is no more than 15% of the barrier mat thickness (2380), and a membrane density of the skirting membrane (3000) is at least 25% less than the density of the barrier mat (2000).

16. A mower path assistance system (1000) to encircle an obstacle projecting from a ground surface, comprising,
a barrier mat (2000) formed with a barrier mat aperture (2100) enclosed by the barrier mat (2000) and having a barrier mat aperture diameter (2120), a perimeter edge, and a barrier mat installation slit (2200) extending from the perimeter edge to the barrier mat aperture (2100), wherein the barrier mat installation slit (2200) has a length that is 25-100% of the aperture diameter (2120) and the barrier mat (2000) is deformable around the barrier mat installation slit (2200) to create a pathway having a pathway width, that is no more than the barrier mat aperture diameter (2120), through which the obstacle may pass from the perimeter to the barrier mat aperture (2100);
the barrier mat (2000) having at least a barrier mat sinistral proximal edge (2320), a barrier mat dextral proximal edge (2330), a barrier mat sinistral distal edge (2340), and a barrier mat dextral distal edge (2350), wherein a barrier mat sinistral distal edge axis intersects a barrier dextral distal edge axis at a barrier mat sinistral distal edge to dextral distal edge angle (2460) that is obtuse, and a barrier mat sinistral proximal edge axis intersects a barrier dextral proximal edge axis at a barrier mat sinistral proximal edge to dextral proximal edge angle (2470) that is obtuse; and
wherein the barrier mat sinistral proximal edge (2320) has a barrier mat sinistral proximal edge x-coordinate length (2322) and a barrier mat sinistral proximal edge y-coordinate length (2324), the barrier mat dextral proximal edge (2330) has a barrier mat dextral proximal edge x-coordinate length (2332) and a barrier mat dextral proximal edge y-coordinate length (2334), the barrier mat sinistral distal edge (2340) has a barrier mat sinistral distal edge x-coordinate length (2342) and a barrier mat sinistral distal edge y-coordinate length (2344), and the barrier mat dextral distal edge (2350) has a barrier mat dextral distal edge x-coordinate length (2352) and a barrier mat dextral distal edge y-coordinate length (2354), wherein the barrier mat sinistral proximal edge x-coordinate length (2322) is at least 50% greater than the barrier mat sinistral proximal edge y-coordinate length (2324), the barrier mat sinistral distal edge x-coordinate length (2342) is at least 50% greater than the barrier mat sinistral distal edge y-coordinate length (2344), the barrier mat dextral proximal edge x-coordinate length (2332) is at least 50% greater than the barrier mat dextral proximal edge y-coordinate length (2334), and the barrier mat dextral distal edge x-coordinate length (2352) is at least 50% greater than the barrier mat dextral distal edge y-coordinate length (2354).

17. The system of claim 16, wherein the barrier mat sinistral proximal edge x-coordinate length (2322) is 50-200% greater than the barrier mat sinistral proximal edge y-coordinate length (2324), the barrier mat sinistral distal edge x-coordinate length (2342) is 50-200% greater than the barrier mat sinistral distal edge y-coordinate length (2344), the barrier mat dextral proximal edge x-coordinate length (2332) is 50-200% greater than the barrier mat dextral proximal edge y-coordinate length (2334), and the barrier mat dextral distal edge x-coordinate length (2352) is 50-200% greater than the barrier mat dextral distal edge y-coordinate length (2354).

18. The system of claim 16, wherein the barrier mat sinistral proximal edge x-coordinate length (2322) is greater than the aperture diameter (2120) and the barrier mat sinistral proximal edge y-coordinate length (2324) is less than the aperture diameter (2120), the barrier mat sinistral distal edge x-coordinate length (2342) greater than the aperture diameter (2120) and the barrier mat sinistral distal edge y-coordinate length (2344) is less than the aperture diameter (2120), the barrier mat dextral proximal edge x-coordinate length (2332) is greater than the aperture diameter (2120) and the barrier mat dextral proximal edge y-coordinate length (2334) is less than the aperture diameter (2120), and the barrier mat dextral distal edge x-coordinate length (2352) is greater than the aperture diameter (2120) and the barrier mat dextral distal edge y-coordinate length (2354) is less than the aperture diameter (2120).

19. The system of claim 16, wherein at least two of the barrier mat sinistral proximal edge x-coordinate length (2322), the barrier mat dextral proximal edge x-coordinate length (2332), the barrier mat sinistral distal edge x-coordinate length (2342), the barrier mat dextral distal edge x-coordinate length (2352) are substantially equal, the barrier mat sinistral distal edge to dextral distal edge angle (2460) is no more than 150 degrees, and the barrier mat sinistral proximal edge to dextral proximal edge angle (2470) is no more than 150 degrees.

20. A mower path assistance system (1000) to encircle an obstacle projecting from a ground surface, comprising, a barrier mat (2000) formed with a barrier mat aperture (2100) enclosed by the barrier mat (2000) and having a barrier mat aperture diameter (2120), a perimeter edge, and a barrier mat installation slit (2200) extending from the perimeter edge to the barrier mat aperture (2100), wherein the barrier mat installation slit (2200) has a length that is 25-100% of the aperture diameter (2120) and the barrier mat (2000) is deformable around the barrier mat installation slit (2200) to create a pathway having a pathway width, that is no more than the barrier mat aperture diameter (2120), through which the obstacle may pass from the perimeter to the barrier mat aperture (2100);

the barrier mat (2000) having at least a barrier mat sinistral proximal edge (2320), a barrier mat dextral proximal edge (2330), a barrier mat sinistral distal edge (2340), and a barrier mat dextral distal edge (2350), wherein a barrier mat sinistral distal edge axis intersects a barrier dextral distal edge axis at a barrier mat sinistral distal edge to dextral distal edge angle (2460) that is obtuse and at least 100 degrees and no more than 170 degrees, and a barrier mat sinistral proximal edge axis intersects a barrier dextral proximal edge axis at a barrier mat sinistral proximal edge to dextral proximal edge angle (2470) that is obtuse and at least 100 degrees and no more than 170 degrees;

the barrier mat sinistral proximal edge (2320) has a barrier mat sinistral proximal edge x-coordinate length (2322) and a barrier mat sinistral proximal edge y-coordinate length (2324), the barrier mat dextral proximal edge (2330) has a barrier mat dextral proximal edge x-coordinate length (2332) and a barrier mat dextral proximal edge y-coordinate length (2334), the barrier mat sinistral distal edge (2340) has a barrier mat sinistral distal edge x-coordinate length (2342) and a barrier mat sinistral distal edge y-coordinate length (2344), and the barrier mat dextral distal edge (2350) has a barrier mat dextral distal edge x-coordinate length (2352) and a barrier mat dextral distal edge y-coordinate length (2354), wherein the barrier mat sinistral proximal edge x-coordinate length (2322) is at least 50% greater than the barrier mat sinistral proximal edge y-coordinate length (2324), the barrier mat sinistral distal edge x-coordinate length (2342) is at least 50% greater than the barrier mat sinistral distal edge y-coordinate length (2344), the barrier mat dextral proximal edge x-coordinate length (2332) is at least 50% greater than the barrier mat dextral proximal edge y-coordinate length (2334), and the barrier mat dextral distal edge x-coordinate length (2352) is at least 50% greater than the barrier mat dextral distal edge y-coordinate length (2354); and the barrier mat sinistral proximal edge x-coordinate length (2322) is greater than the aperture diameter (2120) and the barrier mat sinistral proximal edge y-coordinate length (2324) is less than the aperture diameter (2120), the barrier mat sinistral distal edge x-coordinate length (2342) greater than the aperture diameter (2120) and the barrier mat sinistral distal edge y-coordinate length (2344) is less than the aperture diameter (2120), the barrier mat dextral proximal edge x-coordinate length (2332) is greater than the aperture diameter (2120) and the barrier mat dextral proximal edge y-coordinate length (2334) is less than the aperture diameter (2120), and the barrier mat dextral distal edge x-coordinate length (2352) is greater than the aperture diameter (2120) and the barrier mat dextral distal edge y-coordinate length (2354) is less than the aperture diameter (2120).

* * * * *